United States Patent
Jiang et al.

(10) Patent No.: US 10,612,512 B2
(45) Date of Patent: Apr. 7, 2020

(54) ENERGY STORAGE AND POWER GENERATION SYSTEM AND METHOD

(71) Applicant: North China Electric Power University (NCEPU), Beijing (CN)

(72) Inventors: Tong Jiang, Beijing (CN); Ziwei Chen, Beijing (CN)

(73) Assignee: North China Electric Power University (NCEPU), Beijing (CN)

( * ) Notice: Subject to any disclaimer, the term of this patent is extended or adjusted under 35 U.S.C. 154(b) by 217 days.

(21) Appl. No.: 15/840,612

(22) Filed: Dec. 13, 2017

(65) Prior Publication Data

US 2018/0180019 A1 Jun. 28, 2018

Related U.S. Application Data

(63) Continuation of application No. PCT/CN2017/076801, filed on Mar. 15, 2017.

(30) Foreign Application Priority Data

Dec. 28, 2016 (CN) .......................... 2016 1 1238777

(51) Int. Cl.
  *F03B 13/06* (2006.01)
  *F03B 15/02* (2006.01)
  *H02J 15/00* (2006.01)

(52) U.S. Cl.
  CPC .............. *F03B 13/06* (2013.01); *F03B 15/02* (2013.01); *H02J 15/003* (2013.01); *H02J 15/006* (2013.01); *F05B 2220/32* (2013.01); *F05B 2220/706* (2013.01); *F05B 2260/42* (2013.01); *F05B 2260/60* (2013.01); *Y02E 10/22* (2013.01); *Y02E 10/226* (2013.01); *Y02E 60/17* (2013.01)

(58) Field of Classification Search
  CPC ........ F03B 13/06; Y02E 10/22; H02J 15/006; H02J 15/003
  See application file for complete search history.

(56) References Cited

U.S. PATENT DOCUMENTS 9,109,512 B2 * 8/2015 Ingersoll .................. F02C 6/16

* cited by examiner

*Primary Examiner* — Abiy Teka
(74) *Attorney, Agent, or Firm* — Slater Matsil, LLP

(57) ABSTRACT

A combined gas-liquid two-phase energy storage and power generation system includes a compressed gas storage unit, a first gas pipeline, a liquid piston device, a hydraulic energy conversion unit and a first pumped power generation unit. The combined gas-liquid two-phase energy storage and power generation system connects the liquid piston device and a first port group of the hydraulic energy conversion unit and receives/outputs the hydraulic potential from/to the first port group, and connects the first pumped power generation unit with the second port group of the hydraulic energy conversion unit and receives/outputs the hydraulic potential from/to the second port group.

16 Claims, 19 Drawing Sheets

ENERGY STORAGE AND POWER GENERATION SYSTEM AND METHOD

This application is a continuation of international patent application PCT/CN2017/076801, filed Mar. 15, 2017, entitled "Combined Gas-Liquid Two-phase Energy Storage and Power Generation System", which claims priority to Chinese Patent Application No. 201611238777.7, filed with the Chinese Patent Office on Dec. 28, 2016 and entitled "Combined Gas-Liquid Two-phase Energy Storage and Power Generation System", which are incorporated herein by reference in their entireties.

BACKGROUND

A power system may comprise a variety of power sources, transmission lines, distribution centers and loads. The power sources, transmission lines, distribution centers and loads form a network, which is commonly known as the grid. The power sources are used to generate electric power. The power sources may be power generators utilize different technologies such as solar energy sources (e.g., solar panels), wind generators (e.g., wind turbines), combined heat and power (CHP) systems, marine energy, geothermal, biomass, fuel cells, micro-turbines and/or the like.

Power demand in a power system may vary within one day. The demand may peak during daytime and early evening hours and drop dramatically during the night. On the other hand, due to the nature of renewable energy, the outputs of some power sources such as solar panels and wind turbines may vary considerably depending on uncontrollable natural factors such as wind strength and/or the like.

In order to provide reliable and stable power to critical loads, the power system may include a plurality of power storage units such as utility-scale energy storage systems, batteries and/or the like. The power storage units are designed so as to be capable of converting excess capacity into stored energy during off-peak hours and recovering the stored energy and converting it back to electricity during peak hours.

The energy storage units may be implemented as a rechargeable battery system, a compressed air energy storage system, a pumped storage hydroelectric system and/or the like. In a pumped storage hydroelectric system, during off-peak hours, the power generated by the power sources is greater than the power demand of the power system. The excess power may be utilized to pump water from a lower reservoir into an elevated reservoir. As such, excess electric energy is converted into potential energy and stored in the elevated reservoir. During peak hours, the water in the elevated reservoir is released to drive a water turbine. The water turbine is coupled to an electric generator, which converts potential energy back to electricity.

SUMMARY OF THE INVENTION

These and other problems are generally solved or circumvented, and technical advantages are generally achieved, by preferred embodiments of the present disclosure which provide a system for storing energy in a compressed gas storage unit and generating electric power using the compressed gas.

At least one embodiment of the disclosure provides a combined gas-liquid two-phase energy storage and power generation system and a corresponding energy storage and power generation method. The combined gas-liquid two-phase energy storage and power generation system includes a compressed gas storage unit, a first gas pipeline, a liquid piston device, a hydraulic potential energy conversion unit and a first pumped power generation unit. The compressed gas storage unit comprises a liquid storage space, a gas storage space interconnected with the liquid space and a first high-pressure liquid pipeline connected with the liquid storage space. During an energy storage process, the first gas pipeline is used for transporting gas to be compressed. During a power generation process, the first gas pipeline is used for transporting the expanded gas. The liquid piston device is connected to the gas storage space and the first gas pipeline, respectively. The hydraulic potential energy conversion unit comprises a first port group and a second port group. The liquid piston device and the first port group are connected. The liquid piston device and the first port group are configured to receive/output hydraulic potential energy from/to the first port group. The first pumped power generation unit is connected with the second port group. The first pumped power generation and the second port group are configured to receive/output hydraulic potential energy from/to the second port group. The combined gas-liquid two-phase energy storage and power generation system can reduce the cost and improve the efficiency of an energy storage and power generation system.

At least one embodiment of the present disclosure provides a combined gas-liquid two-phase energy storage and power generation system comprising a compressed gas storage unit, a first gas pipeline, a liquid piston device, a hydraulic potential energy conversion unit and a first pumped power generation unit. The compressed gas storage unit comprises a liquid storage space and a gas storage space interconnected with the liquid storage space. The liquid storage is connected with a first high-pressure liquid pipeline. The gas storage space is configured to store compressed gas with a stable pressure and use the compressed gas for storing energy. The liquid storage space is configured to store liquid. The first high-pressure liquid pipeline is configured to maintain the pressure of the compressed gas through inputting/outputting liquid to/from the liquid storage space. During an energy storage process, the first gas pipeline is used for transporting gas to be compressed. During a power generation process, the first gas pipeline is used for transporting the expanded gas. The liquid piston device is connected with the gas storage space and the first gas pipeline, respectively. The hydraulic potential energy conversion unit comprises a first port group and second port group. The hydraulic potential energy conversion unit is configured to convert the hydraulic potential energy of the first port group into the hydraulic potential energy of the second port group, and convert the hydraulic potential energy of the second port group into the hydraulic potential energy of the first port group. The first pumped power generation unit is configured to use electricity to pump liquid so as to convert electrical energy into hydraulic potential energy or utilize the hydraulic potential energy to generate electric power. The liquid piston device and the first port group are connected to each other and configured to receive/output hydraulic potential energy from/to the first port group. The first pumped power generation unit and the second port group are connected to each other and configured to receive/output hydraulic potential energy from/to the second port group.

At least one embodiment of the present disclosure provides a combined gas-liquid two-phase energy storage power system and an energy storage and power generation method. The system and method comprise during a process of storing energy, a first pumped power generation unit is used to pump liquid and convert electrical energy into hydraulic potential energy, which is sent to the second port group. The hydraulic potential energy conversion unit is used to convert the hydraulic potential energy of the second port group to the hydraulic potential energy of the first port group. The hydraulic potential energy of the first port group is used to send liquid into the liquid piston device. The liquid in the liquid piston device converts the gas to be compressed into the compressed gas. Furthermore, the compressed gas is transferred to the compressed gas storage unit in a constant pressure manner or an equal density manner. During a power generation process, the compressed gas stored in the storage unit is transferred to the liquid piston device in an equal pressure manner or an equal density manner. Through the liquid piston device, the expansion of the compressed gas pushes the liquid of the first port group to generate hydraulic potential energy by doing work on the liquid. The hydraulic potential energy conversion unit uses the hydraulic potential energy of the second port group to generate electricity.

In accordance with an embodiment, a system comprises a compressed gas storage unit comprising a liquid storage space, a gas storage space connected to the liquid storage space and a first high-pressure liquid pipe connected to the liquid storage space, wherein the gas storage space is configured to store compressed gas with a stable pressure, and the liquid storage space is configured to store liquid, and the first high-pressure liquid pipe is configured to maintain a pressure of the compressed gas by inputting or outputting liquid to/from the liquid storage space, a first gas pipe configured to transport gas to be compressed in an energy storage process and deliver expanded gas in a power generation process, a liquid piston device connected to the gas storage space and the first gas pipe respectively, a hydraulic potential energy conversion unit comprising a first port group and a second port group and configured to convert hydraulic potential energy between the first port group and the second port group and a first pumped power generation unit configured to convert electric energy into the hydraulic potential energy through extracting the liquid and generate electricity by utilizing the hydraulic potential energy, wherein the liquid piston device is connected to the first port group and configured to receive/output the hydraulic potential energy from/to the first port group, the first pumped power generation unit is connected to the second port group and configured to receive/output the hydraulic potential energy from/to the second port group.

In accordance with another embodiment, a method comprises in an energy storage process, converting electric energy into hydraulic potential energy by extracting liquid through a first pumped power generation unit and outputting the hydraulic potential energy to a second port group of a hydraulic potential energy conversion unit connected to the first pumped power generation unit, converting the hydraulic potential energy of the second port group to hydraulic potential energy of a first port group of the hydraulic potential energy conversion unit, by using the hydraulic potential energy of the first port group, pushing the liquid into a liquid piston device and converting gas to be compressed into compressed gas, transporting the compressed gas from the liquid piston device to a compressed gas storage unit in a first equal pressure or equal density manner.

The method further comprises in a power generation process, transporting a portion of the compressed gas from the compressed gas storage unit to the liquid piston device in a second equal pressure or equal density manner, forming hydraulic potential energy at the first port group through doing work by expansion of the compressed gas in the liquid piston device, converting the hydraulic potential energy of the first port group to hydraulic potential energy of the second port group and generating electricity using the hydraulic potential energy of the second port group through the first pumped power generation unit.

In accordance with yet another embodiment, a method comprises in an energy storage process, converting electric energy into hydraulic potential energy by pumping liquid through a first pumped power generation unit, in the energy storage process, converting the hydraulic potential energy between a first port group and a second port group of a hydraulic potential energy conversion unit connected to the first pumped power generation unit, in the energy storage process, converting gas to be compressed into compressed gas in a liquid piston device using the hydraulic potential energy and in the energy storage process, transporting the compressed gas from the liquid piston device to a compressed gas storage unit in a first equal pressure manner.

The method further comprises in a power generation process, transporting the compressed gas from the compressed gas storage unit to the liquid piston device in a second equal pressure manner, in the power generation process, forming hydraulic potential energy at the first port group through doing work by expansion of the compressed gas in the liquid piston device, in the power generation process, converting the hydraulic potential energy between the first port group and the second port group and in the power generation process, generating electric power using the hydraulic potential energy through the first pumped power generation unit.

An advantage of an embodiment of the present disclosure is that the combined gas-liquid two-phase energy storage power system can efficiently store energy in compressed gas and generate electric power using the compressed gas.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
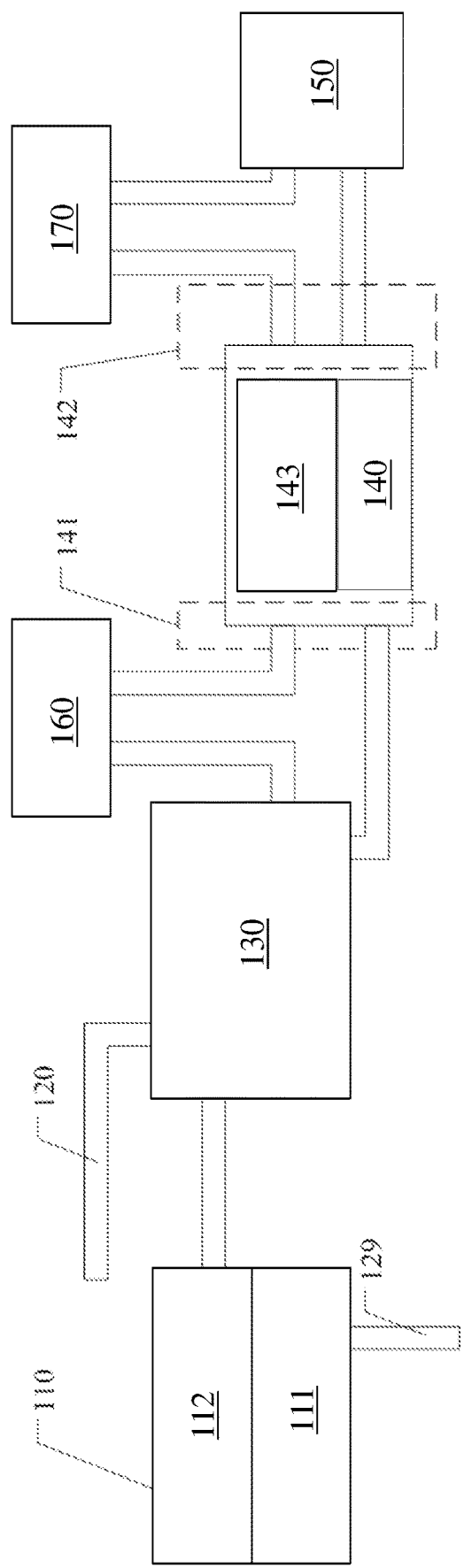
FIG. 1 is a block diagram of a combined gas-liquid two-phase energy storage system in accordance with various embodiments of the present disclosure.

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments of the disclosure, and do not limit the scope of the disclosure.

The present disclosure will now be described, by way of example, with reference to the accompanying drawings. It should be noted that the described embodiments are part of the present application, not all embodiments. All other embodiments obtained by one of ordinary skills in the art without knowledge of the present disclosure are within the scope of this disclosure.

Unless otherwise defined, technical terms or scientific terms used in this disclosure should be of ordinary interest to those of ordinary skills in the art to which this disclosure pertains. The "first", "second" and similar words used in this disclosure do not denote any order, quantity or importance, but are merely intended to distinguish between different constituents. The words "comprising" or "comprising of" and the like terms mean the elements or objects preceding the word include the elements or objects listed after the words and their equivalents, but not excluding other elements or objects. The words "connected" or "coupled" and the like are not limited to physical or mechanical connections, but may include electrical connections, whether directly or indirectly.

In the study, the applicants of the present application have found that, for a conventional large-capacity energy storage technique, the pumped power storage technology requires a long construction period and harsh geographical environment requirements. On the other hand, the compressed gas storage technology has some limitations. The limitation is the gas turbine may consume gas, which causes many issues such as environmental pollutions, easy-to-leak, a low energy density and other issues. In addition, during the processes of compressing and expanding the gas, the temperature changes dramatically. The dramatic change of the temperature may lead to greater damages to the relevant equipment, thereby resulting in higher equipment costs and higher subsequent equipment maintenance costs.

The embodiment of the disclosure provides a combined gas-liquid two-phase energy storage and power generation system and a corresponding energy storage and power generation method. The combined gas-liquid two-phase energy storage and power generation system includes a compressed gas storage unit, a first gas pipeline, a liquid piston device, a hydraulic potential energy conversion unit and a first pumped power generation unit. The compressed gas storage unit comprises a liquid storage space, a gas storage space interconnected with the liquid storage space and a first high-pressure liquid pipe connected to the liquid storage space. The gas storage space is for storing the compressed gas having a stable pressure and the compressed gas is for storing energy. The liquid storage space is used to store the liquid. The first high-pressure liquid pipe maintains the pressure of the compressed gas by inputting or outputting the liquid to/from the liquid storage space. The liquid cannot be compressed. As such, the volume of the liquid storage space can be changed by inputting and outputting the liquid to/from the liquid storage space. After the volume of the liquid has been changed, the gas pressure increases or decreases accordingly. During the process of compressing the gas, the first gas pipeline is used to transport the gas to be compressed. During the process of expanding the gas, the first gas pipeline is used to deliver the expanded gas. The liquid piston device is connected with the gas storage space and the first gas pipe, respectively. The hydraulic potential energy conversion unit includes a first port group and a second port group. The hydraulic potential energy conversion unit is used for converting the hydraulic potential energy of the first port group into the hydraulic potential energy of the second port group, and converting the hydraulic potential energy of the second port group into the hydraulic potential energy of the first port group. The first pumped power generation unit is used to extract (or pump) the liquid (e.g., water) with electrical energy and convert the electrical energy into the hydraulic potential energy or to generate electricity using the hydraulic potential energy. The liquid piston device and the first port group are connected together and configured to receive and output the hydraulic potential energy from/to the first port group. The first pumped power generation unit is connected to the second port group. The first pumped power generation unit and the second port group are configured to receive and output the hydraulic potential energy from/to the second port group. Thus, the combined gas-liquid two-phase energy storage system can provide a new energy storage system. The combined gas-liquid two-phase energy storage system does not require a gas turbine, and hence cannot consume gas. This system can avoid environmental pollution issues and the like. In addition, since the compressed gas storage unit can maintain the pressure of the compressed gas by inputting or outputting the liquid to/from the liquid storage space through the first high-pressure liquid pipe, it is possible to avoid damages to the compressed gas storage unit during the processes of compressing/expanding gas. Such a well maintained pressure may extend the life the compressed gas storage unit. At the same time, the constant pressure of the compressed gas storage unit can be used to provide a stable water head (a fixed water hydraulic potential) for the first pumped power generation unit, thereby reducing the loss from the water head change on the turbine generator blade. As a result, the power generation efficiency of the first pumped power generation unit can be improved.

The present disclosure will be described with respect to embodiments in a specific context, a combined gas-liquid two-phase energy storage system. The embodiments of the disclosure may also be applied, however, to a variety of energy storage and power generation systems. Hereinafter, various embodiments will be explained in detail with reference to the accompanying drawings.

FIG. 1 is a block diagram of a combined gas-liquid two-phase energy storage system in accordance with various embodiments of the present disclosure. The combined gas-liquid two-phase energy storage system includes a compressed gas storage unit 110, a first gas pipe 120, a liquid piston device 130, a hydraulic potential energy conversion unit 140 and a first pumped power generation unit 150. It should be noted throughout description, a pipe (e.g., a first gas pipe) may be alternatively referred to as a pipeline (e.g., a first gas pipeline). As shown in FIG. 1, the compressed gas storage unit 110 includes a liquid storage space 111 and a gas storage space 112 (the gas in the liquid storage space 111 and the gas storage space 112 may be in contact with each other) interconnected with the liquid storage space 111, and a first high-pressure liquid pipe 129 connected to the liquid storage space 111. The gas storage space 112 for storing the compressed gas has a stable pressure and uses the compressed gas to store energy. The liquid storage space 111 is for storing the liquid. The first high-pressure liquid pipe 129 is used to maintain the pressure of the compressed gas by inputting or discharging the liquid to/from the liquid storage space 111. The first gas pipe 120 is used to deliver the gas to be compressed (e.g., the first gas pipeline may be connected to the source of the gas to be compressed) during the process of storing energy and deliver the expanded gas during the process of generating electricity. The liquid piston device 130 is connected to the gas storage space 112 and the first gas pipe 120, respectively. The hydraulic potential energy conversion unit 140 includes a first port group 141 and a second port group 142. The hydraulic potential energy conversion unit 140 is used for converting the hydraulic potential energy of the first port group 141 into the hydraulic potential energy of the second port group 142, and converting the hydraulic potential energy of the second port group 142 to the hydraulic potential energy of the first port group 141. The first pumped power generation unit 150 may be used to extract liquid (e.g., water) through using electrical energy so as to convert the electrical energy into the hydraulic potential energy. On the other hand, the first pumped power generation unit 150 is used to generate electricity using the hydraulic potential energy. The liquid piston device 130 is connected to the first port group 141. The liquid piston device 130 receives and outputs the hydraulic potential energy from/to the first port group 141. The first pumped power generation unit 150 is connected to the second port group 142. The first pumped power generation unit 150 can receive and output the hydraulic potential energy from/to the second port group 142. It should be noted that the liquid storage space and the gas storage space refer to the space occupied by the liquid and the gas respectively, and that the boundary between the liquid storage space and the gas storage space may be reduced with the increase of the liquid, the reduction of the gas, the reduction of the liquid and/or the increase in gas. The liquid storage space and the gas storage space are not fixed.

In the combined gas-liquid two-phase energy storage and power generation system provided by the present embodiment, the combined gas-liquid two-phase energy storage system can provide a new type of energy storage and power generation system. During a process of storing energy, the combined gas-liquid two-phase energy storage and power generation system can convert the electric energy into the hydraulic potential energy (for example, by way of pumping water) through the first pumped power generation unit, and transport the hydraulic potential energy to the second port group of the hydraulic potential energy conversion unit. The hydraulic potential energy conversion unit is used to convert the hydraulic potential energy of the second port group to the hydraulic potential of the first port group and further converted into the hydraulic potential energy of the liquid in the liquid piston device. The liquid in the liquid piston device compresses the gas in the liquid piston device into the compressed gas, which is transferred to the compressed gas storage unit in an equal pressure manner. The hydraulic potential of the liquid in the liquid piston device is stored in the compressed gas, thereby realizing the storage of the electric energy in the compressed gas. For example, the energy storage process can be performed when the power system (power grid) load is light. During the process of generating electric power, the combined gas-liquid two-phase energy storage system can transfer the compressed gas in the compressed gas storage unit into the liquid piston device in an equal pressure manner. The compressed gas expands and does work on the liquid piston device. The work on the liquid piston device converts the energy stored in the compressed gas into the hydraulic potential of the liquid in the liquid piston device, and the hydraulic potential of the liquid in the liquid piston device is further transferred to the first port group. At this time, the hydraulic potential energy of the first port group can be converted into the hydraulic potential energy of the second port group by the hydraulic potential energy conversion unit and further transported to the first pumped power generating unit to generate electricity, thereby achieving the process of converting the energy stored in the compressed gas into electrical energy.

The combined gas-liquid two-phase energy storage system does not require a gas turbine. In other words, the combined gas-liquid two-phase energy storage system does not consume gas, thereby saving costs and avoiding environmental pollutions and other issues. In addition, the compressed gas storage unit can maintain the pressure of the compressed gas by inputting or outputting the liquid from/to the liquid storage space. For example, when the pressure in the liquid storage space drops below a preset value, the liquid can be inputted into the liquid storage space to increase the pressure in the liquid storage space. The liquid portion in the liquid storage space can be discharged to reduce the pressure in the liquid storage space when the pressure of the liquid storage space rises and exceeds above the preset value, thereby avoiding unnecessary damages to the compressed gas storage unit during the processes of compressing/expanding the gas due to the pressure fluctuation in the liquid storage space, thereby extending the life of the compressed gas storage unit. On the other hand, since the compressed gas storage unit is designed (stored with a compressed gas having a stable pressure) without having the concerns of pressure and/or temperature variations, the construction cost and/or the manufacturing of the compressed gas storage unit can be reduced and/or simplified. It should be noted that the above-mentioned transferring in a constant pressure manner (isostatic transfer) means that the compressed gas is transferred from the compressed gas storage unit to the liquid piston device and the pressure of the compressed gas is kept constant, or the pressure of the compressed gas does not change when the compressed gas is transferred from the liquid piston device to the compressed gas storage unit.

It should be noted that the above-mentioned liquid piston device may be a plurality of specific liquid piston members. For example, a plurality of liquid piston members may be connected in series. The gas can be compressed in each liquid piston member. Furthermore, the plurality of specific liquid piston members may be provided in a variable pressure cascade.

Figure 2:
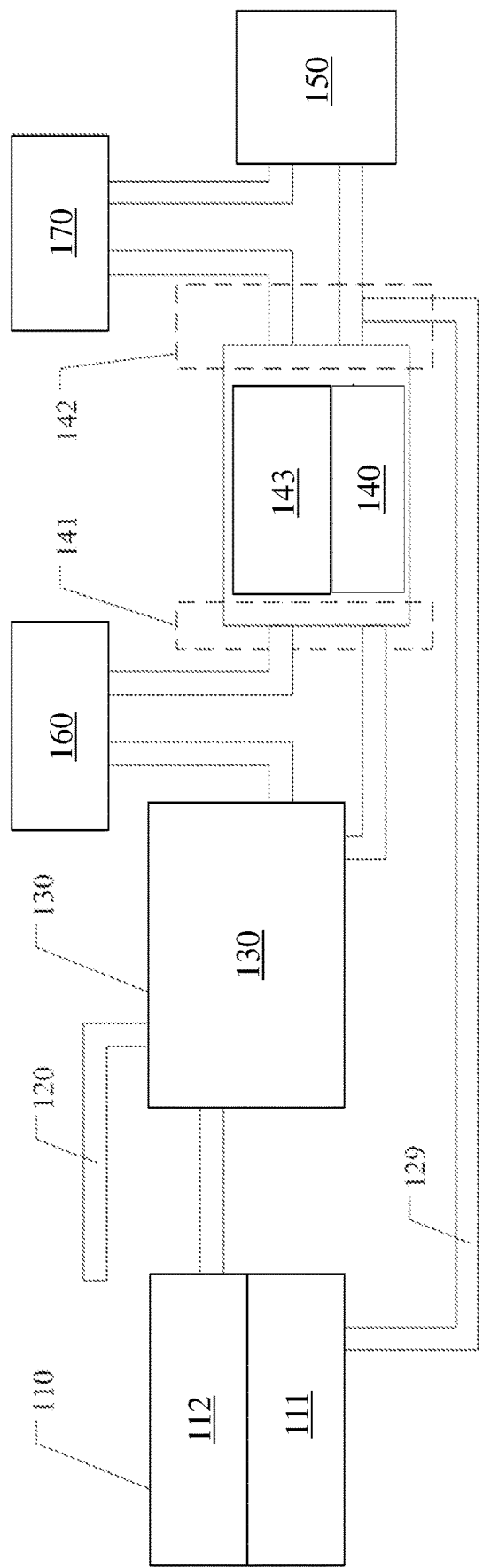
FIG. 2 is a block diagram of another combined gas-liquid two-phase energy storage system in accordance with various embodiments of the present disclosure.

FIG. 2 is a block diagram of another combined gas-liquid two-phase energy storage system in accordance with various embodiments of the present disclosure. One end of the first high-pressure liquid pipe 129 may be connected to the liquid storage space 111 and the other end is connected to the second port group 142. Since the first pumped power generation unit 150 is also connected to the second port group 142, the first high-pressure liquid pipe 129 is also connected to the first pumped power generation unit 150. Thus, the combined gas-liquid two-phase energy storage and power generation system can adjust the intake/outlet amount of liquid of the compressed gas storage unit 110 (through the first high-pressure liquid pipe 129) through the first pumped power generation unit 150 during an isostatic migration of the compressed gas so as to ensure a stable pressure of the compressed gas stored in the compressed gas storage unit 110. On the other hand, the combined gas-liquid two-phase energy storage system can ensure that a fixed water head applied to the first pumped power generation unit 150 is provided by the steady pressure of the compressed gas storage unit 110 during the process of generating power, thereby improving the power generation efficiency of the combined gas-liquid two-phase energy storage system. For example, a hydro-generator of the first pumped power generation unit can achieve the highest power generation efficiency at a fixed water head. The constantly changing (unstable) water head of the hydro-generator may hurt the blade of the hydro-generator. The first high-pressure liquid pipeline is also connected with the first pumped power generation unit. That is, the compressed gas storage unit is connected to the first pumped power generation unit. As such, the inlet pressure of the water head at the time of power generation of the first pumped power generation unit can be stabilized by the stable pressure of the compressed gas storage unit. As a result, the first pumped power generation unit can achieve a higher power generation efficiency.

As shown in FIG. 2, the hydraulic potential energy conversion unit 140 further includes a switching adjustment unit 143 for adjusting the conversion rate of the hydraulic potential energy of the hydraulic potential energy conversion unit 140. Thus, the combined gas-liquid two-phase energy storage system can adjust the inlet/outlet amount of liquid of the compressed gas storage unit by using the switching adjustment unit during the an isostatic migration of the compressed gas so as to ensure the stable pressure of the compressed gas storage unit 110.

It should be noted that there are two methods of maintaining a stable pressure of the compressed gas storage unit. First, the above-described first pumped power generation unit adjusts the steady pressure of the compressed gas storage unit through the intake/outlet amount of the liquid to/from the compressed gas storage unit (through the first high-pressure liquid pipe and liquid valves). Second, the amount of water discharged from the compressed gas storage unit is adjusted by the switching adjustment unit so as to ensure that the stable pressure of the compressed gas storage unit. These two methods can be used separately or in combination. That is, the amount of water entering and leaving the compressed gas storage unit can be adjusted by using the above-mentioned first pumped power generation unit and the switching adjustment unit. Of course, embodiments of the present disclosure include, but are not limited thereto, and other methods may be used to ensure a stable pressure of the compressed gas storage unit. For example, the other end of the first high-pressure liquid pipe may be connected to an external water supply device to secure the steady pressure of the compressed gas storage unit by means of the external water supply device. Alternatively, the other end of the first high-pressure liquid pipe may be connected to the first port group, and the steady pressure of the compressed gas storage unit is maintained by the first port group.

As shown in FIG. 2, the combined gas-liquid two-phase energy storage and power generation system in the example embodiment of the present embodiment also includes a first liquid source 170. The first liquid source 170 is connected to the first pumped power generation unit 150 and the second port group 142 of the hydraulic potential energy conversion unit 140, respectively. The first pumped power generation unit 150 may pump the liquid in the first liquid source 170 and deliver it to the hydraulic potential energy conversion unit 140. The liquid eventually flows back to the first liquid source 170 via the hydraulic potential energy conversion unit 140. That is, the first liquid source 170, the first pumped power generation unit 150, the hydraulic potential energy conversion unit 140, and the first liquid source 170 may be configured to continuously convert electrical energy into hydraulic potential energy and convey the hydraulic potential energy to the second port group 142 of the hydraulic potential energy conversion unit 140. Alternatively, the hydraulic potential energy conversion unit 140 may utilize the hydraulic potential energy of the second port group 142 to pump/extract the liquid in a first liquid source 170 and further deliver the liquid to the first pumped power generation unit 150 for power generation. The liquid flows back to the first liquid source 170 via the first pumped power generation unit 150. That is, the first liquid source 170, the hydraulic potential energy conversion unit 140, the first pumped power generation unit 150 and the first liquid source 170 may constitute a liquid circulation so that the hydraulic potential energy of the second port group 142 can be continuously converted into electrical energy. It is to be understood that embodiments of the disclosure include, but are not limited thereto, and other specific means and apparatus may be used to effect the mutual conversion between the hydraulic potential energy and the electrical energy of the second port group. It should be noted that while the above-described liquid circulation includes a closed loop, a non-closed cycle may also be employed depending on different applications and design needs. For example, during the power generation process of the energy storage system, the gas moving out of the compressed gas storage unit and the water flowing out of the first liquid source are equal to the sum of the water of the first liquid source and the water flowing into the compressed gas storage unit.

As shown in FIG. 2, the combined gas-liquid two-phase energy storage and power generation system provided in the example embodiment of the present embodiment also includes a second liquid source 160. The second liquid source 160 is connected to the liquid piston device 130 and the first port group 141 of the hydraulic potential energy conversion unit 140, respectively. The second liquid source 160 is used for receiving the liquid discharged from the liquid piston device 130 and supplying the liquid to the liquid piston device 130. That is, the second liquid source 160, the first port group 141 and the liquid piston device 130 may form a liquid circulation path. The liquid in the second liquid source 160 may be delivered to the liquid piston device 130 using the hydraulic potential of the first port group 141. The hydraulic potential of the first port group 141 converts the hydraulic potential energy of the liquid in the liquid piston device 130. In addition, the second liquid source 160 may also provide a plurality of liquids at different temperatures for the purpose of controlling the temperature during the gas compression and expansion processes in the liquid piston device 130. The liquid in the second liquid source 160 may be water or oil, but is not limited thereto.

Figure 3:
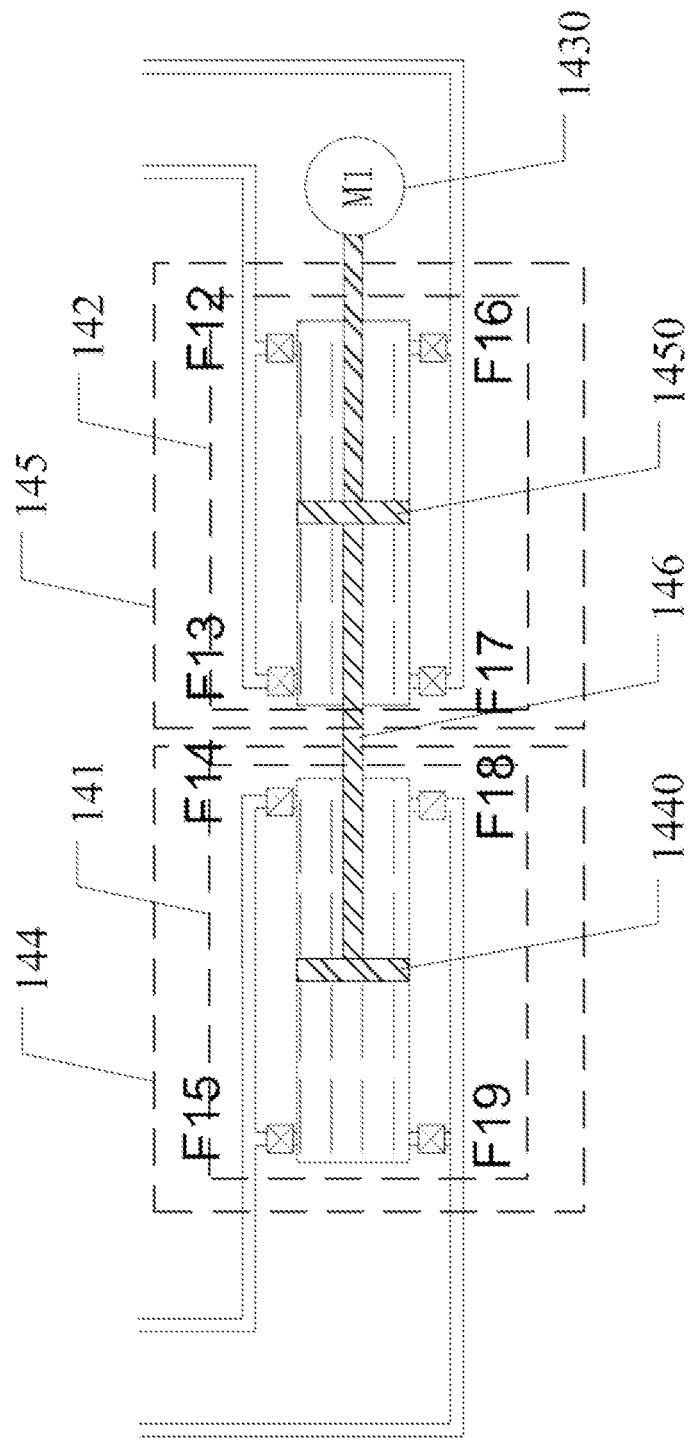
FIG. 3 is a structure diagram of the hydraulic potential energy conversion unit in accordance with various embodiments of the present disclosure.

FIG. 3 is a structure diagram of the hydraulic potential energy conversion unit in accordance with various embodiments of the present disclosure. As shown in FIG. 3, the hydraulic potential energy conversion unit 140 includes a first hydraulic piston apparatus 144 and a second hydraulic piston apparatus 145. The first hydraulic piston apparatus 144 includes a first piston 1440. The second hydraulic piston apparatus 145 includes a second piston 1450. The first piston 1440 and the second piston 1450 are connected by a link 146. The first hydraulic piston apparatus 144 also includes the first port group 141. The second hydraulic piston apparatus 145 also includes the second port group 142. When the liquid pushes the first piston 1440, the first piston 1440 drives the second piston 1450 to move accordingly through the link 146. When the liquid pushes the second piston 1450, the second piston 1450 may drive the second piston 1450 to move accordingly through the link 146. As such, the hydraulic potential energy conversion unit 140 can convert the hydraulic potential energy of the first port group 141 to the hydraulic potential energy of the second port group 142, or convert the hydraulic potential energy of the second port group 142 into the hydraulic potential energy of the first port group 141. It should be noted that the first port group or the second port group may include a port at both ends of the first hydraulic piston apparatus or the second hydraulic piston apparatus so as to allow the liquid to enter the first hydraulic piston apparatus and the second hydraulic piston apparatus at different port locations. The first piston 1440 and/or the second piston 1450 are moved in a reciprocating manner so that the hydraulic potential energy conversion unit can continuously convert the hydraulic potential energy.

For example, the first hydraulic piston apparatus and the second hydraulic piston apparatus may have different cross-sectional areas so that the liquid flow ratio of the first port group to the second port group can be adjustable. Of course, the hydraulic potential energy conversion unit may be replaced by an adaptive hydraulic potential energy conversion unit so that the liquid flow ratio of the first port group to the second port group can be adjusted. The embodiments of the present disclosure are not limited thereto. Of course, the hydraulic potential energy conversion unit may include a plurality of hydraulic cylinders of different cross-sectional areas to form a first hydraulic piston apparatus and a second hydraulic piston apparatus so as to adjust the liquid flow ratio of the first port group to the second port group. It should be noted that there is no restriction herein.

As shown in FIG. 3, the switching adjustment unit 143 may include a first motor 1430. The first motor 1430 may adjust the movement rate of the first piston 1440 and the second piston 1450 to balance the hydraulic potential energy of the first port group 141 and the second port group 142 of the hydraulic potential energy conversion unit 140 so as to adjust the liquid flow rate of the first port group 141 or the liquid flow rate of the second port group 142.

Figure 4:
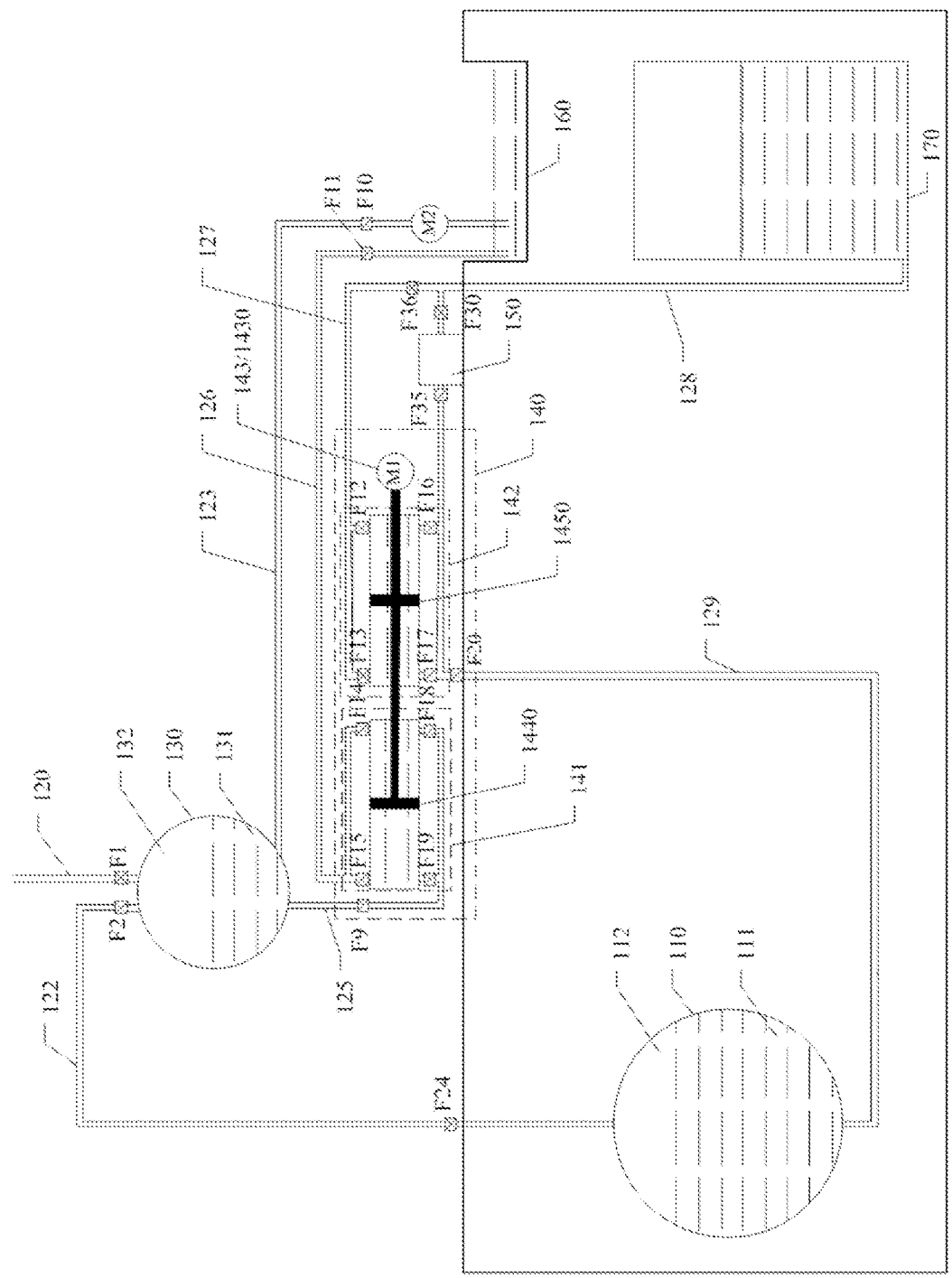
FIG. 4 illustrates is a structure diagram of the combined gas-liquid two-phase energy storage and power generation system in accordance with various embodiments of the present disclosure.

FIG. 4 is a structure diagram of the combined gas-liquid two-phase energy storage and power generation system in accordance with various embodiments of the present disclosure. As shown in FIG. 4, the combined gas-liquid two-phase energy storage system includes a compressed gas storage unit 110, a first gas pipe 120, a liquid piston device 130, a hydraulic potential energy conversion unit 140, a first pumped power generation unit 150, a second liquid source 160 and a first liquid source 170. The gas storage space 112 of the compressed gas storage unit 110 is connected to the liquid piston device 130 through a compressed gas pipe 122. The liquid piston device 130 is connected to the first gas pipe 120. The liquid piston device 130 is connected to the second liquid source 160 through a liquid pipe 123. The first port group 141 of the hydraulic potential energy conversion unit 140 is connected to the liquid piston device 130 and the second liquid source 160 through a liquid pipe 125 and a liquid pipe 126, respectively. The second port group 142 of the hydraulic potential energy conversion unit 140 is connected to the liquid storage space 111 of the compressed gas storage unit 110 and the first liquid source 170 through the first high-pressure liquid pipe 129, a liquid pipe 127 and a liquid pipe 128, respectively. The first pumped power generation unit 150 is connected to the first high-pressure liquid pipe 129, the second port group 142 and the first liquid source 170. The switching adjustment unit 143 includes a first motor 1430 connected to the link 146 for controlling the movement speed of the second piston 1450. FIG. 4 further illustrates valves F1, F2, F9, F10, F11, F12, F13, F14, F15, F16, F17, F18, F19, F20, F24, F30, F35, F36, and a second motor 182 over a liquid pipe 123. The valve F1 is on the first gas pipe 120. The valves F2 and F24 are between the gas storage space 112 and the liquid piston device 130 and over the compressed gas pipe 122. The valve F10 is disposed between the second liquid source 160 and the hydraulic potential energy conversion unit 140, and over the liquid pipe 123. The valve Flt is between the second liquid source 160 and the liquid piston device 130, and over the liquid pipe 126. The valves F12, F13, F16, and F17 are at the second port group 142. The valves F14, F15, F18 and F19 are at the first port group 141 of the hydraulic potential energy conversion unit 140. The valve F20 is between the second port group 142 and the liquid storage space 111, and over the first high-pressure liquid pipe 129. The valve F30 is between the first pumped power generation unit 150 and the liquid pipe 127. The valve F35 is between the second port group 142 and the first pumped power generation unit 150. The valve F36 is over the liquid pipe 127. It should be noted that the number of valves and the positions of the valves in the combined gas-liquid two-phase energy storage system can be selected according to the actual situation, and the embodiments of the present disclosure are not limited thereto.

The combined gas-liquid two-phase energy storage system stores energy through the following steps. The valve F1 is turned open so that the gas to be compressed is filled in the portion 132 of the liquid piston device 130. All the valves are turned closed. Assuming that the piston of the hydraulic potential energy conversion unit 140 moves to the right first (it is merely an example). The valves F9, F11, F12, F15, F17, F18, F20, F30, F35 and F36 are turned open. The first motor 1430 is controlled such that the second piston 1450 drives the first piston 1440 to move to the right through the link 146, and further control the first pumped power generation unit 150 to feed the liquid of the first liquid source 170 to the second port group 142 through the liquid pipe 128. The second piston 1450 is pushed by the pressure difference between the first high-pressure liquid pipe 129 and the first liquid source 170. The first piston 1440 is driven by the second piston 1450 to move to the right by the link 146. At the same time, by controlling the first motor 1430 and the first pumped power generation unit 150, the system makes the liquid inflow amount of the compressed gas storage unit 110 equal to the liquid outflow amount of the compressed gas storage unit 110 to ensure that the pressure of the compressed gas storage unit 110 to be constant. Since the second piston 1450 drives the first piston 1440 to move to the right through the link 146, the liquid in the second liquid source 160 is injected into the liquid piston device 130 via the valve F11, the liquid pipe 126, the valves F15, F18, F9 and the liquid pipe 125. The liquid in the liquid piston device 130 compresses the gas in the liquid piston device 130. The heat released in the compression process is absorbed by the liquid in the liquid piston device 130. The gas stored in the liquid piston device 130 is used to store the potential energy. When the second piston moves to the rightmost point, the valves F12, F15, F17 and F18 are turned closed, and the valves F13, F14, F16 and F19 are turned open. The first pumped power generation unit 150 feeds the liquid of the first liquid source 170 to the second port group 142 through the liquid pipe 128. Through the pressure difference between the first high-pressure liquid pipe 129 and the first liquid source 170, the second piston 1450 is pushed and the first piston 1440 is driven by the second piston 1450 to move to the left through the link 146. Such a motion continues to compress the gas in the liquid piston device 130 by the liquid in the liquid piston device 130. The motions (move to the right first and move to the left) described above repeat again until the gas in the liquid piston device 130 is compressed to a predetermined pressure. The valves F2 and F24 are turned open. The gas storage space 112 of the compressed gas storage unit 110 is connected to the liquid piston device 130 through the compressed gas pipe 122. The liquid from the second liquid source 160 is injected into the liquid piston device 130 through the liquid pipe 126. The liquid in the liquid piston device 130 pushes the compressed gas to the gas storage space 112 of the compressed gas storage unit 110 in an equal pressure manner. The amount of liquid flowing out of the liquid storage space 111 of the compressed gas storage unit 110 can be adjusted by controlling the first motor 1430. Furthermore, by controlling the first motor 1430, the first pumped power generation unit 150 can be adjusted to control the amount of liquid flowing into of the liquid storage space 111 of the compressed gas storage unit 110. Such an adjustment can make the amount of liquid flowing out of the liquid storage space 111 of the compressed gas storage unit 110 be equal to the sum of the intake amount of the compressed gas and the intake amount liquid of the compressed gas storage unit 110. As a result, during the isobaric migration process, the pressure of the compressed gas in the compressed gas storage unit 110 is maintained constant. After the isobaric migration process finishes, all valves are turned closed. The valves F1 and F10 are turned open, and the second motor 182 discharges the liquid from the liquid piston device 130 to the second liquid source 160. It should be noted that the second motor 182 may not be provided and the liquid in the liquid piston device 130 may be discharged into the second liquid source 160 through the difference in height between the liquid piston device 130 and the second liquid source 160. The embodiment of the present disclosure is not limited thereto. At the same time, the gas to be compressed is fed and fully filled with the liquid piston device 130 through the first gas pipe 120 and the valve F1. All valves are turned closed. The above-mentioned compression process is repeated until the gas is fully stored in the compressed gas storage unit 110 or the available energy has been fully utilized.

The combined gas-liquid two-phase energy storage system generates electric power through the following steps. The liquid piston device 130 is filled with the liquid. All valves are turned closed. Assuming that the piston (e.g., the second piston 1450) of the hydraulic potential energy conversion unit 140 moves to the left first. The valves F2, F9, F11, F12, F15, F17, F18, F20, F24, F30, F35 and F36 are turned open. The gas storage space 112 of the compressed gas storage unit 110 is connected to the liquid piston device 130 through the compressed gas pipe 122. The liquid in the liquid piston device 130 flows into the second liquid source 160 through the liquid pipe 125, the valves F9, F18, F15 and the liquid pipe 126. The liquid in the first liquid source 170 flows into the compressed gas storage unit 110 through the liquid pipe 128, the liquid pipe 127, the valves F12, F17 and the first high-pressure liquid pipe 129. The liquid in the compressed gas storage unit 110 generates power through the first pumped power generation unit 150 under the pressure difference between the compressed gas storage unit 110 and the first liquid source 170. By adjusting the first motor 1430, the amount of the liquid injected into the compressed gas storage unit 110 through the first high-pressure liquid pipe 129 is equal to the sum of the amount of the liquid flowing out of the compressed gas storage unit 110 and the amount of the compressed gas moving out of the compressed gas storage unit 110. As a result, the compressed gas is transported from the compressed gas storage unit 110 to the liquid piston device 130 in an equal pressure manner. After the compressed gas has been moved from the compressed gas storage unit 110 in the equal pressure manner, the valves F2 and F24 are turned closed, and the compressed gas expands and pushes the liquid in the liquid piston device 130. The compressed gas absorbs the heat of the liquid during the process of doing work by expansion, and converts the energy stored in the compressed gas into liquid potential energy in the liquid piston device 130. The liquid in the liquid piston device 130 flows into the second liquid source 160 through the liquid pipe 125, the valves F9, F18, F15 and the liquid pipe 126. The liquid in the first liquid source 170 passes through the liquid pipe 128, the liquid pipe 127 and the valves F12, F17, and generates electric power through the first pumped power generation unit 150 under the pressure difference between the compressed gas storage unit 110 and the first liquid source 170. At this time, by adjusting the first motor 1430, the amount of the liquid injected into the compressed gas storage unit 110 by the first high-pressure liquid pipe 129 is equal to the amount of the liquid flowing out of the compressed gas storage unit 110 so as to keep the pressure of the compressed gas in the compressed gas storage unit 110 constant. After the piston of the hydraulic potential energy conversion unit 140 (e.g., the second piston 1450) moves to the leftmost end, the valves F15, F18, F12 and F17 are turned closed, and the valves F19, F14, F16 and F13 are turned open. The liquid in the liquid piston device 130 flows into the second liquid source 160 through the liquid pipe 125, the valves F9, F19, F14 and the liquid pipe 126. The liquid in the first liquid source 170 flows through the liquid pipe 128, the liquid pipe 127 and the valves F13, F16, and generates electric power through the first pumped power generation unit 150 under the pressure difference between the compressed gas storage unit 110 and the first liquid source 170. The piston of the hydraulic potential energy conversion unit 140 (e.g., the second piston 1450) moves to the right. The above-mentioned movement of the piston of the hydraulic potential energy conversion unit 140 is repeated until the compressed gas pressure in the liquid piston device 130 is lower than a certain pressure value or the liquid in the liquid piston device 130 is completely discharged into the second liquid source 160.

Figure 5:
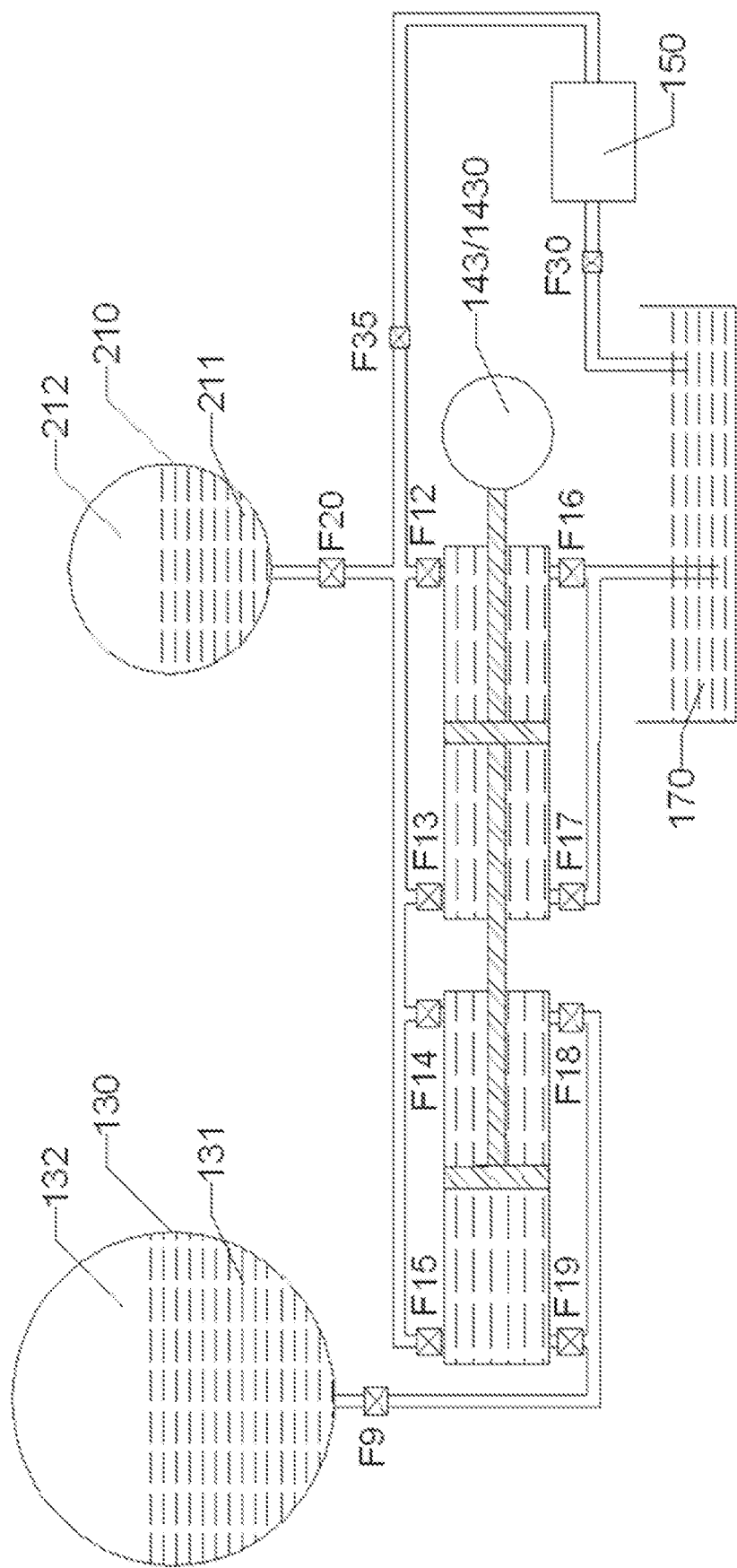
FIG. 5 is a structure diagram of the hydraulic potential energy conversion unit in accordance with various embodiments of the present disclosure.

FIG. 5 is a structure diagram of the hydraulic potential energy conversion unit in accordance with various embodiments of the present disclosure. As shown in FIG. 5, the hydraulic potential energy conversion unit may have a different connection. In particular, the first port group connects the liquid piston devices 130 and a first buffer tank 210. The second port group is connected to the first buffer tank 210 and the first liquid source 170, respectively. The first pumped power generation unit 150 is connected to the first buffer tank 210 and the first liquid source 170, respectively. During the process of storing energy, the first pumped power generation unit 150 pumps the liquid of the first liquid source 170 into the first buffer tank 210, and the liquid is discharged from the first buffer tank 210 and flows into the first liquid source 170 via the second port group under the liquid pressure difference between the first buffer tank 210 and the first liquid source 170. The liquid pushes the piston of the hydraulic potential energy conversion unit to move, and converts the hydraulic potential energy of the second port group into the hydraulic potential energy of the first port group. Through the first port group, the liquid is injected into the liquid piston device 130 to compress the gas. The hydraulic potential energy conversion unit operates smoothly through employing the switching adjustment unit 143/1430, adjusting of the liquid piston device area ratio and controlling the first pumped power generation unit 150. At the same time, the liquid volume in the first buffer tank 210 remains constant so as to ensure that the gas pressure remains constant. During the process of generating electric power, the compressed gas expands in the liquid piston device 130 to expel the liquid out of the liquid piston device 130 through the first port group, and push the piston of the hydraulic potential energy conversion unit to move so as to convert the hydraulic potential energy of the first port group into the hydraulic potential energy of the second port group, thereby bringing the liquid of the first liquid source 170 into the first buffer tank 210 via the second port group. The liquid flows through the first pumped power generation unit 150 into the first liquid source 170. The hydraulic potential energy conversion unit operates smoothly through employing the switching adjustment unit 143/1430, adjusting the liquid piston device area ratio and controlling the first pumped power generation unit 150. At the same time, the liquid volume in the first buffer tank 210 remains constant so as to ensure that the gas pressure remains constant. As a result, the first pumped power generation unit 150 generate electric power under a fixed water head.

Figure 6:
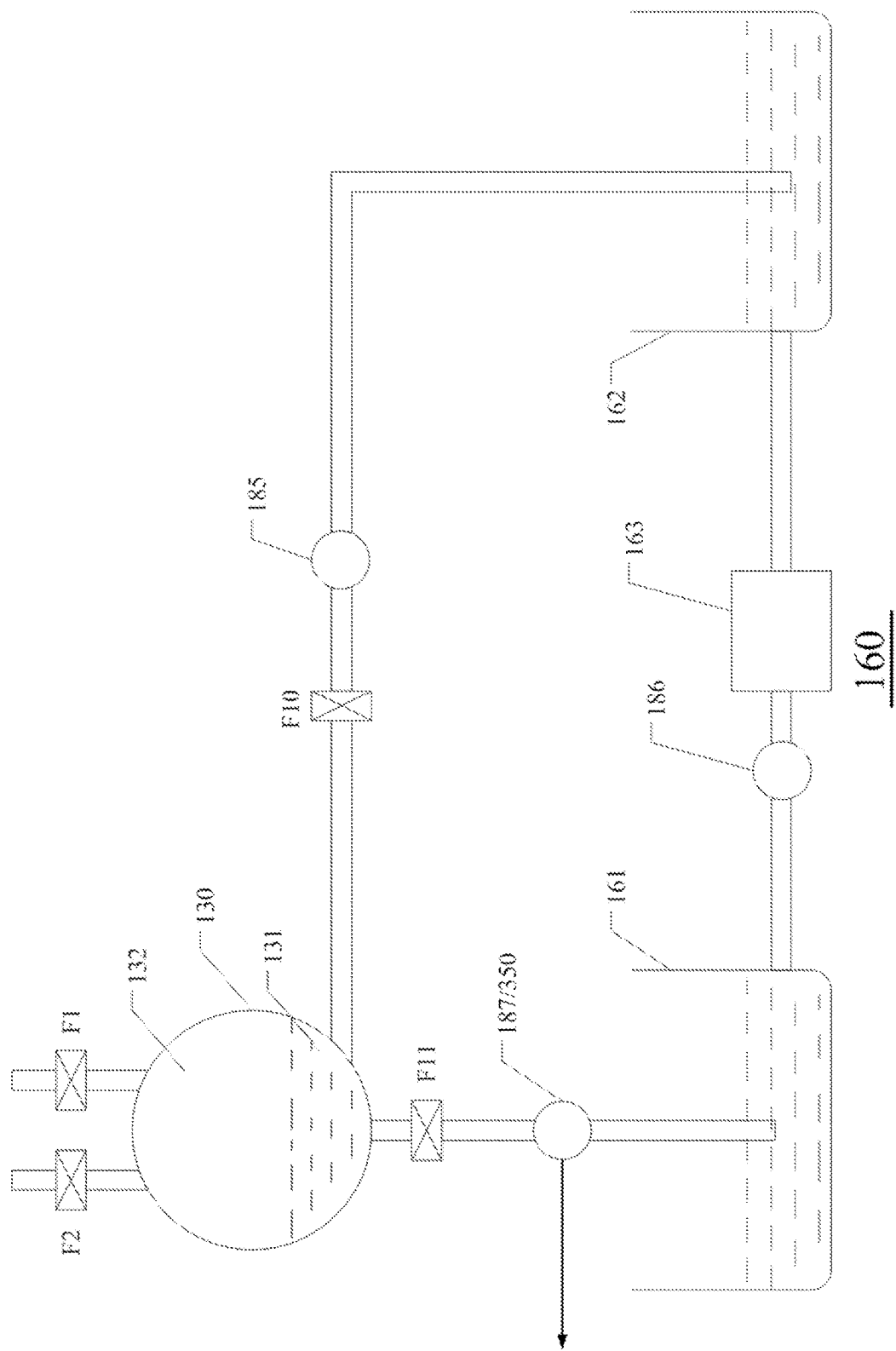
FIG. 6 is a structure diagram of the second liquid source in accordance with various embodiments of the present disclosure.

FIG. 6 is a structure diagram of the second liquid source in accordance with various embodiments of the present disclosure. The second liquid source 160 includes a first temperature control liquid tank 161, a second temperature control liquid tank 162, and a heat exchanger 163 as shown in FIG. 6. The first temperature control liquid tank 161 is connected to the liquid piston device 130. The second temperature control liquid tank 162 is connected to the liquid piston device 130 and the first temperature control liquid tank 161, respectively. The heat exchanger 163 is between the first temperature control liquid tank 161 and the second temperature control liquid tank 162 for exchanging the heat from the liquid supplied from the first temperature control liquid tank 161 to the second temperature control liquid tank 162 or the heat from the liquid supplied from the second temperature control liquid tank 162 to the first temperature control liquid tank 161. The liquid may be heated by suitable heating sources such as solar energy and geothermal energy. Thus, the second liquid source can operate according to different liquid exchange operation strategies. It should be noted that the above-mentioned first temperature control liquid tank 161 and the second temperature control liquid tank 162 may be equipped with a liquid driving device 186 (e.g., a water pump) as required to drive the liquid to flow between the first temperature control liquid tank 161 and the second temperature control liquid tank 162. The above-mentioned second temperature control liquid pool 162 and the liquid piston device 130 may be equipped with a liquid driving device 185 to drive the liquid to flow between the second temperature control liquid tank 162 and the liquid piston device 130. A liquid drive device 187 (e.g., a water pump) may also be provided between the first temperature control liquid tank 161 and the liquid piston device 130 to drive the liquid to flow between the first temperature control liquid tank 161 and the liquid piston device 130. The present disclosure is not limited thereto.

As shown in FIG. 6, the liquid drive device 187 between the liquid piston device 130 and the first temperature control liquid tank 161 may also be replaced with a third pumped power generation unit 350, which is utilized for generating power or transporting the liquid from the first temperature control liquid tank 161 to the liquid piston device 130 under the pressure difference between the first temperature control liquid tank and the liquid in the liquid piston device 130. Thus, the third pumped power generation unit 350 can generate electricity by the pressure difference between the liquid in the liquid piston device 130 and the first temperature control liquid tank 161, thereby increasing the power generation efficiency of the combined gas-liquid two-phase storage power generation system. Of course, the liquid drive device between the liquid piston device and the second temperature control liquid tank may also be replaced by a third pumped power generation unit for generating power or for delivering liquid from the second temperature control liquid tank to the liquid piston device, and the embodiment of the present disclosure is not restricted.

It should be noted that the liquid exchange operation strategy described above may include the following operation modes. First, in an open direct supply operation mode, the first temperature control liquid tank and the second temperature control liquid tank can be combined and no heat exchanger is required. The temperature of the liquid is approximately constant, and the second liquid source may be of sufficient liquid, such as an ocean, a reservoir and the like. In addition, in this mode, the first liquid source may be combined with the second liquid source. Second, in a closed direct supply operation mode, the second liquid source comprises the first temperature control liquid tank and the second temperature control liquid tank. The heat exchanger may not be included in the second liquid source. When the combined gas-liquid two-phase energy storage system is in the process of storing energy, the liquid is fed from the first temperature control liquid tank (or the second temperature control liquid tank) into the liquid piston device, and the heat generated by the gas compression is transferred to the liquid. The heated liquid is stored in the second temperature control liquid tank (or the first temperature control liquid tank), which is thermally-isolated. When the combined gas-liquid two-phase energy storage and power generation system is in the process of generating electric power, the part of the liquid (heated liquid above) from the second temperature control liquid pool (or the first temperature-controlled liquid pool) is sent into the liquid piston device in the gas expansion process to provide heat. After the temperature of the liquid is reduced and at the end of the power generation process, the liquid is stored in the first temperature control liquid tank (or the second temperature control liquid tank), which is thermally-isolated. As such, the liquid has been recycled repeatedly. Thus, the combined gas-liquid two-phase energy storage system can reuse the heat generated during the process of storing energy, thereby improving the efficiency of the combined gas-liquid two-phase energy storage and power generation system. In addition, due to the use of the first temperature control liquid tank and the second temperature control liquid tank, the temperature of the working liquid in the liquid piston device is the same in each gas compression and gas expansion process, which can ensure that after the gas compression or expansion, the same temperature is kept in the combined gas-liquid two-phase energy storage system, and further improve the stability of the combined gas-liquid two-phase energy storage system. Of course, the first temperature-controlled liquid tank and the second temperature-controlled liquid tank may also be combined, and the embodiments of the present disclosure are not limited thereto. Third, in a waste heat utilization mode, the second liquid source may comprise the first temperature control liquid tank, the second temperature control liquid tank and the heat exchanger. The first temperature control liquid tank and the second temperature control liquid tank have liquids with two different temperatures. When the combined gas-liquid two-phase energy storage system is in the process of storing energy, the liquid in the first temperature-controlled liquid tank (or the second temperature-controlled liquid tank) having a high temperature is fed into the liquid piston device, and the heat generated during the process of compressing the gas is transferred to the liquid so that the liquid temperature is further increased. The heated liquid can be used to achieve heating or generating power through the heat exchanger (for example, the high temperature liquid of the first temperature control liquid tank achieves heating or generating power through the heat exchanger and flows into the second temperature control liquid tank and becomes a low temperature liquid). When the combined gas-liquid two-phase energy storage system is in the process of generating electric power, the lower temperature liquid of the second temperature control liquid tank (or the first temperature control liquid tank) is sent into the liquid piston device. During the expansion process of the compressed gas, the compressed gas absorbs heat from the liquid. During the process, both the temperature of the gas and the temperature of the liquid temperature are reduced. This can achieve a refrigeration effect through the heat exchanger. Thus, the combined gas-liquid two-phase energy storage system can also utilize low-quality heat. Fourth, in a high efficiency power generation mode, the second liquid source comprises the first temperature control liquid tank and the second temperature control liquid tank. When the combined gas-liquid two-phase energy storage system is in the process of storing energy, the low temperature liquid in the second temperature-controlled liquid tank (or the first temperature-controlled liquid tank) is fed into the liquid piston device, and the heat generated in the process of compressing the gas is absorbed by the low temperature liquid. The gas temperature and the gas pressure are reduced accordingly. This can reduce the energy consumed during the process of compressing the gas. When the combined gas-liquid two-phase energy storage system is the process of generating electric power, the high temperature liquid of the first temperature control liquid tank (or the second temperature control liquid tank) is fed into the liquid piston device. The gas absorbs the heat of the high temperature liquid, and the gas temperature and the gas pressure are increased so as to achieve a higher energy output.

Figure 7:
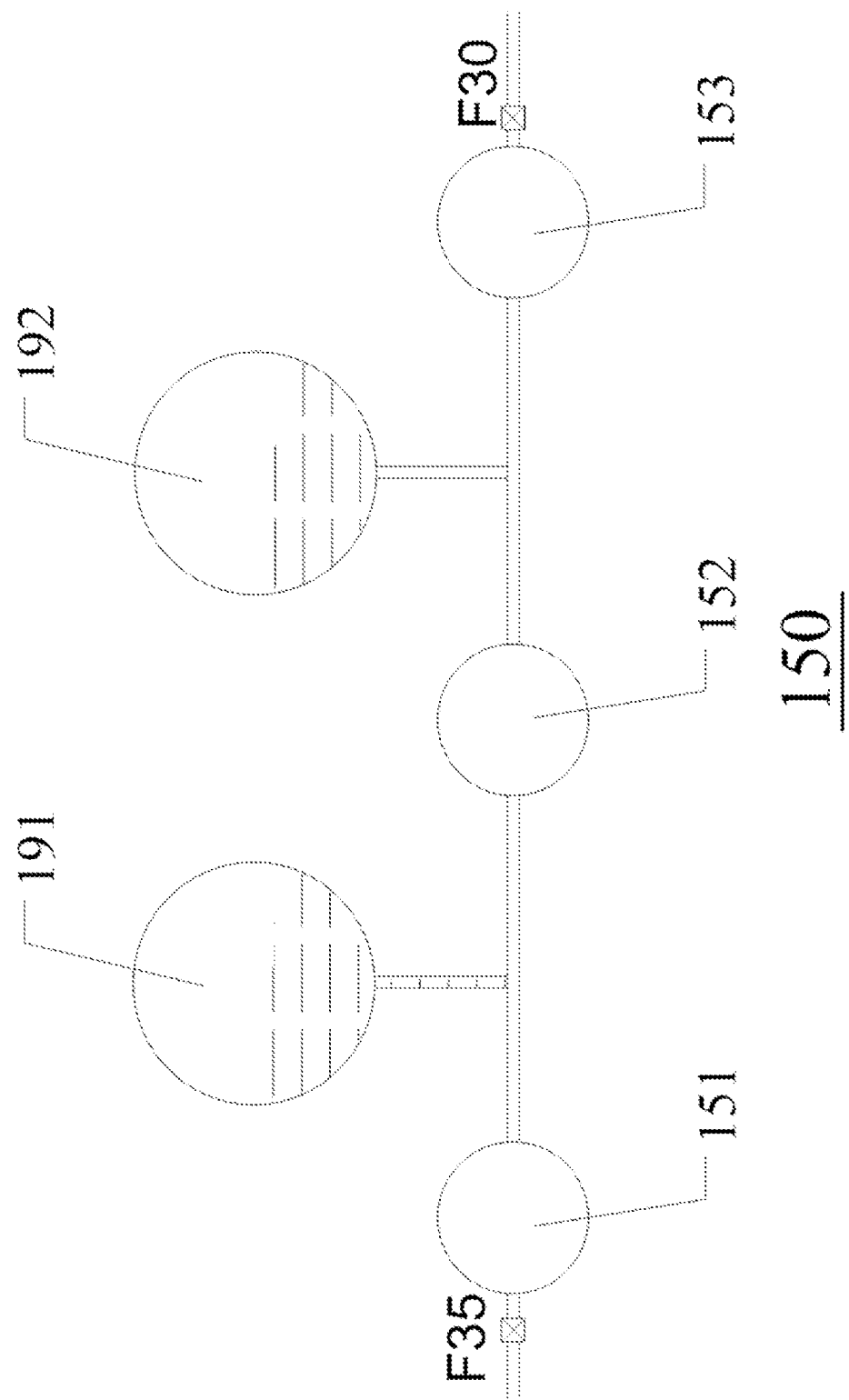
FIG. 7 is a structure diagram of the first pumped storage power generating unit in accordance with various embodiments of the present disclosure.

FIG. 7 is a structure diagram of the first pumped storage power generating unit in accordance with various embodiments of the present disclosure. The first pumped power generation unit 150 includes a plurality of hydro-generators connected in series and a water head stabilization tank placed between two adjacent hydro-generators. As shown in FIG. 7, the first pumped power generation unit 150 includes a first hydro-generator unit 151, a second hydro-generator unit 152 and a third hydro-turbine generator unit 153. A first water head stabilization tank 191 is between the first hydro-generator unit 151 and the second hydro-generator unit 152. A second water head stabilization tank 192 is between the second hydro-generator unit 152 and the third hydro-turbine generator unit 153. The water head of the first hydro-generator unit 151 is the liquid pressure difference between the first high-pressure liquid pipe and the first water head stabilizing tank. The water head of the second hydro-generator unit 152 is the liquid pressure difference between the first water head stabilizing tank 191 and the second water head stabilizing tank 192. The water head of the third hydro-turbine generator unit 153 is the liquid pressure difference between the second water head stabilizing tank 192 and the low pressure water tank 170. Thus, the power generation efficiency of the combined gas-liquid two-phase energy storage and power generation system can be improved by connecting a plurality of hydro-generator units in series. On the other hand, water head adjustment tanks are placed between adjacent hydro-generator units to ensure the stable and efficient operation of the hydro-generator units.

Figure 8:
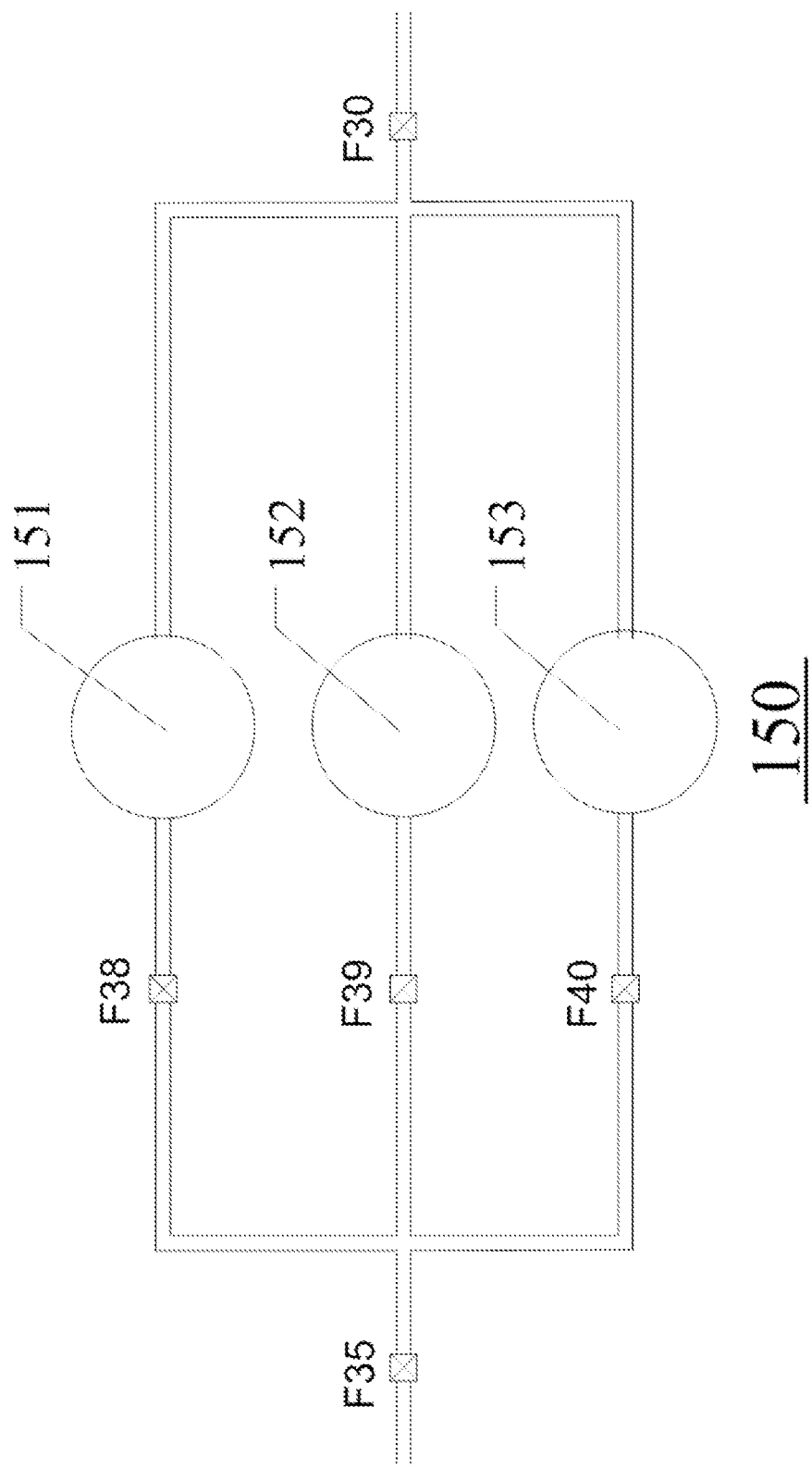
FIG. 8 is a structure diagram of another first pumped storage power generation unit in accordance with various embodiments of the present disclosure.

FIG. 8 is a structure diagram of another first pumped storage power generation unit in accordance with various embodiments of the present disclosure. The first pumped power generation unit may include a plurality of hydro-generators connected in parallel. As shown in FIG. 8, the first pumped power generation unit 150 includes a first hydro-generator unit 151, a second hydro-generator unit 152, and a third hydro-turbine generator unit 153 connected in parallel. The embodiments of the present disclosure are not limited thereto.

Figure 9:
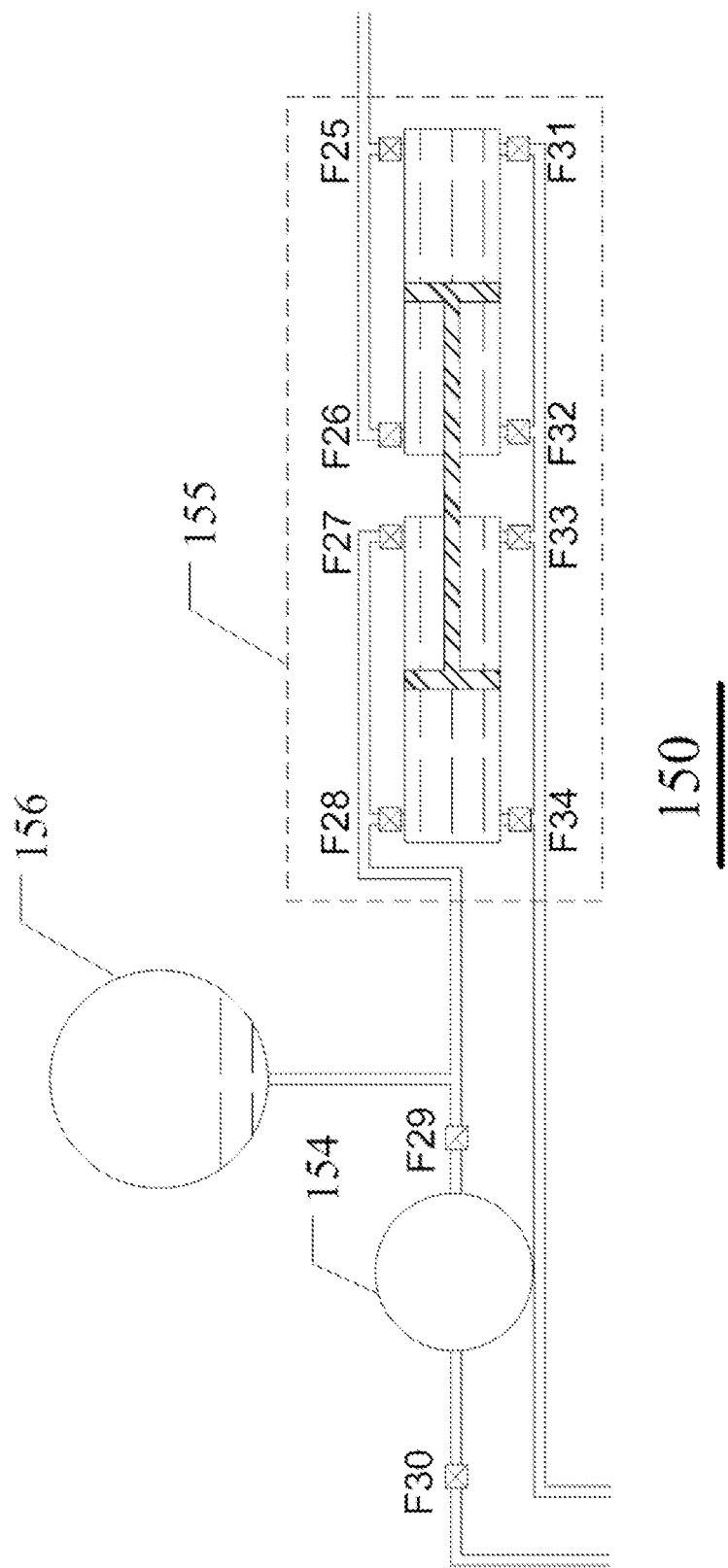
FIG. 9 is a structure diagram of another first pumped storage power generation unit in accordance with various embodiments of the present disclosure.

FIG. 9 is a structure diagram of another first pumped storage power generation unit in accordance with various embodiments of the present disclosure. As shown in FIG. 9, the first pumped power generation unit 150 may include a hydro-generator unit 154, a pressure conversion unit 155 and a water head stabilization tank 156. The pressure conversion unit 155 is located at the water inlet side of the hydro-generator unit 154 (between the second port group and the hydro-turbine unit). The water head stabilization tank 156 is between the hydro-generator unit 154 and the pressure conversion unit 155. The pressure conversion unit 155 converts the magnitude of the pressure applied to the pumped power generation unit 150. For example, if the pressure applied to the pumped power generation unit 150 is too large and exceeds the maximum load of the hydro-generator unit 154, the pressure conversion unit 155 may convert the pressure applied to the pumped power generation unit 150 into a smaller pressure and apply it to the hydro-generator unit 154 for generating electric power. The pressure arrangement in the hydro-generator unit 154 and the pressure conversion unit 155 ensures that the pressure generated from the pressure conversion unit 155 remains stable so as to ensure that the hydro-generator unit 154 generates power under a constant water head. It should be noted that the above-mentioned pressure conversion unit may be constructed in a configuration similar to that of the hydraulic potential energy conversion unit. The cross-sectional area difference between the first hydraulic piston device and the second hydraulic piston device is employed to convert the pressure applied to the pumped power generation unit into a smaller or larger pressure, which is applied to the hydro-generator. The specific structure thereof is described in detail in some relevant references, and the embodiments of the present disclosure do not describe it herein.

Figure 10:
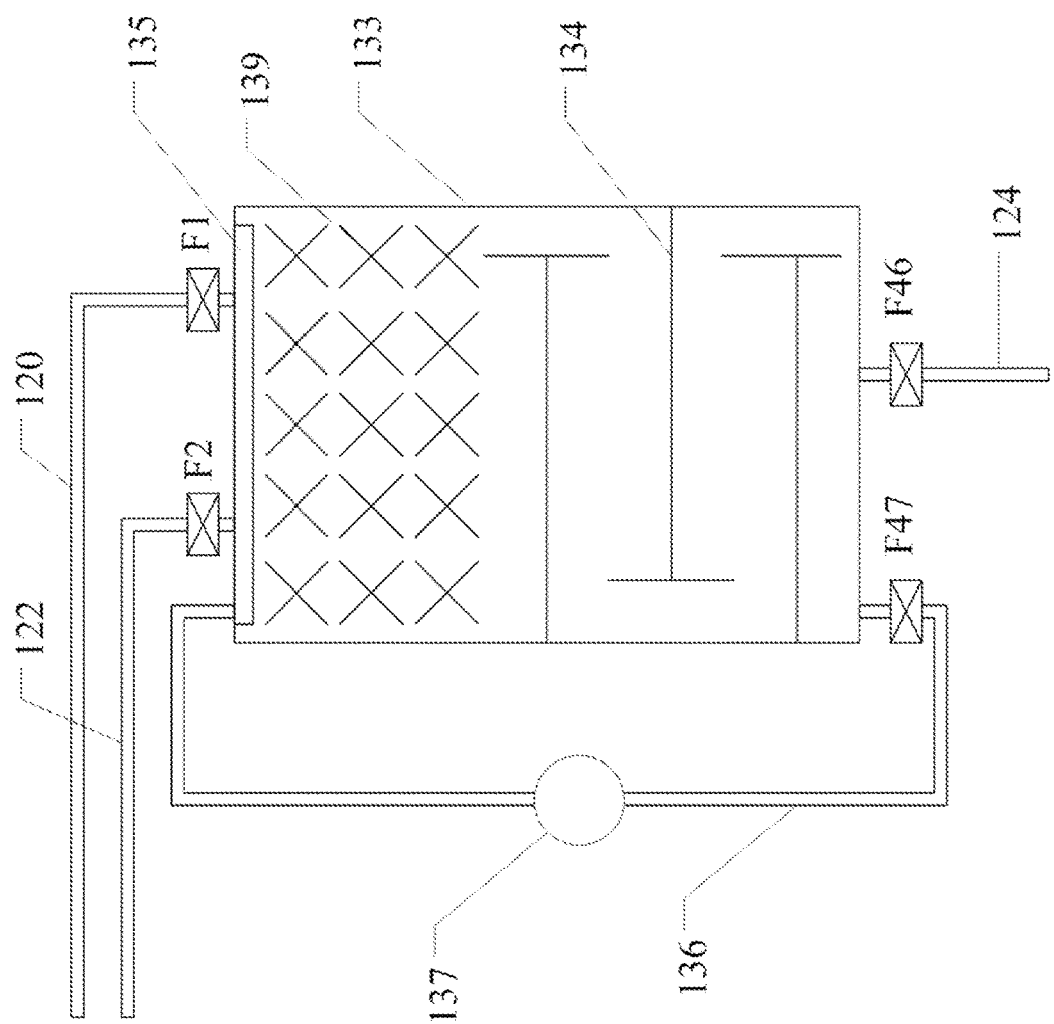
FIG. 10 illustrates a structure diagram of the liquid piston device in accordance with various embodiments of the present disclosure.

FIG. 10 illustrates a structure diagram of the liquid piston device in accordance with various embodiments of the present disclosure. As shown in FIG. 10, the liquid piston device 130 includes a pressure vessel 133, a plate 134 (at least one plate), a liquid distributor 135, a liquid circulation pipe 136, a circulation motor 137 and a filler 139. The plate 134 (at least one plate) is placed at a lower portion of the pressure vessel 133. The filler 139 is over the plate 134. The liquid distributor 135 is placed at an upper portion of the pressure vessel 133 and is over the filler 139. The liquid circulation pipe 136 is connected between the top of the pressure vessel 133 and the bottom of the pressure vessel 133. The circulation motor 137 is on the liquid circulation pipe 136, and supplies the liquid at the bottom of the pressure vessel 133 to the top of the pressure vessel 133 through the liquid circulation pipe 136. Thus, the liquid piston device 130 can increase the contact area of the liquid and the gas in the pressure vessel 133 (i.e., the liquid piston device) through the plate 134 (at least one plate), the filler 139, the liquid distributor 135, the liquid circulation pipe 136 and the circulation motor 137. This configuration can increase the heat exchange rate of the liquid and the gas in the pressure vessel 133. It should be noted that the pressure vessel can be any suitable vessels such as a boiler, a chemical tower, an underground pressure cave and the like.

As shown in FIG. 10, the compressed gas pipe 122 is connected to the top of the pressure vessel 133 for inputting or outputting the compressed gas. The first gas pipe 120 is connected to the top of the pressure vessel 133 for inputting or outputting the gas to be compressed. The liquid pipe 124 is connected to the bottom of the pressure vessel 133 for inputting or outputting the liquid. In addition, the combined gas-liquid two-phase energy storage and power generation system also includes valves F1, F2, F46 and F47. The valve F1 is on the first gas pipe 120. The valve F2 is on the compressed gas pipe 122. The valve F47 is on the liquid circulation pipe 136. The valve 46 is on the liquid pipe 124.

The gas compression process in the liquid piston device 130 comprises the following steps. At an initial state, the pressure vessel 133 is filled with liquid. All valves are turned closed, and then the valves F1 and F46 are turned open. The gas to be compressed is fed from the first gas pipe 120. The liquid is discharged through the liquid pipe 124 and the valve F46. The valve F1 is turned closed. The liquid is supplied to the pressure vessel 133 through the liquid pipe 124 so as to compress the gas in the pressure vessel 133. At the same time, the valve F47 is turned open, and a portion of the liquid at the bottom of the pressure vessel 133 is pumped to the top of the pressure vessel 133 through the circulation motor 137. The liquid flows uniformly from the top of the pressure vessel 133 through the liquid distributor 135. When the liquid flows down to the bottom, the liquid has a direct heat exchange with the gas in the pressure vessel 133. When the liquid passes through the filler 139, the liquid forms a liquid film between the filler 139, thereby increasing the contact area between the gas and the liquid. The plate 134 reduces the gas rising speed as well as the liquid flowing-down speed. The liquid flowing down on the plate 134 forms a liquid layer having a certain height on the plate 134. After the gas compression process finishes, the valves F46 and F47 are turned closed. The valve F2 is turned open. The compressed gas is fed into the compressed gas pipe 122. Thus, the liquid piston device can increase the contact area between the liquid and the gas in the pressure vessel 133 (i.e., the contact area between the liquid piston device and the liquid piston device) and increase the liquid-gas heat exchange rate in the pressure vessel 133. In addition, the plate may include many small holes (e.g., a sieve). The gas passes through the small holes on the plate. When the volume of the gas is reduced, the small holes help to increase the contact area between the gas and the liquid film so that the gas and the liquid film can have a sufficient heat exchange. In other words, the small holes on the plate can further improve the liquid-gas heat exchange rate in the pressure vessel 133.

The gas expansion process in the liquid piston device 130 includes the following steps. At an initial state, the pressure vessel 133 is filled with liquid and all the valves are turned closed. The valves F2 and F46 are turned open, and the compressed gas is fed from the gas pipe 122 into the pressure vessel 133. After a predetermined volume of compressed gas has been fed into the pressure vessel 133, the valve F2 is turned closed. The gas expands in the pressure vessel 133 and pushes the liquid of the pressure vessel 133 to do work externally. During the gas expansion process, a portion of the liquid at the bottom of the pressure vessel 133 is pumped to the top of the pressure vessel 133 by the circulation motor 137. The liquid flows uniformly from the top of the pressure vessel 133 to the bottom of the pressure vessel 133 through the liquid distributor 135. During the process of flowing from the top of the pressure vessel 133 to the bottom of the pressure vessel 133, the flowing-down liquid helps to control the temperature of the gas so as to achieve a constant temperature gas expansion process, which helps to improve the efficiency of the process of generating electric power. In addition, during the process of flowing from the top of the pressure vessel 133 to the bottom of the pressure vessel 133, the liquid has a direct heat exchange with the gas in the pressure vessel 133 through the collision between the liquid and the gas. Furthermore, when the liquid passes through the filler 139, the liquid forms a liquid film in or on the various portions of the filler 139, thereby increasing the gas-liquid contact area. The plate 134 reduces both the rate at which the gas rises and the rate at which the liquid flows. The liquid flowing down on the plate 134 forms a liquid film having a certain height on the plate 134. After the gas expansion process finishes, the valve F1 is turned open. The liquid is fed into the pressure vessel 133 through the liquid pipe 124 and the liquid in the pressure vessel 133 pushes the gas out of the pressure vessel 133 through the first gas pipe 120.

In the combined gas-liquid two-phase power storage system, the intake gas pipes and the exhaust gas pipes of the liquid piston device may be separately provided. For example, a separate exhaust gas pipe is connected between the liquid piston device and the upper portion of the compressed gas storage unit. A separate intake gas pipe is connected between the bottom of the liquid piston device and the upper portion of the compressed gas storage unit. During the gas expansion process, the compressed gas from the compressed gas storage unit is fed from the bottom of the liquid piston device. The gas has a sufficient heated exchange with the liquid when the gas moves up from the bottom of the liquid piston device to the top of the liquid piston device, thereby improving the heat exchange rate, which helps to improve the power generation efficiency.

Figure 11:
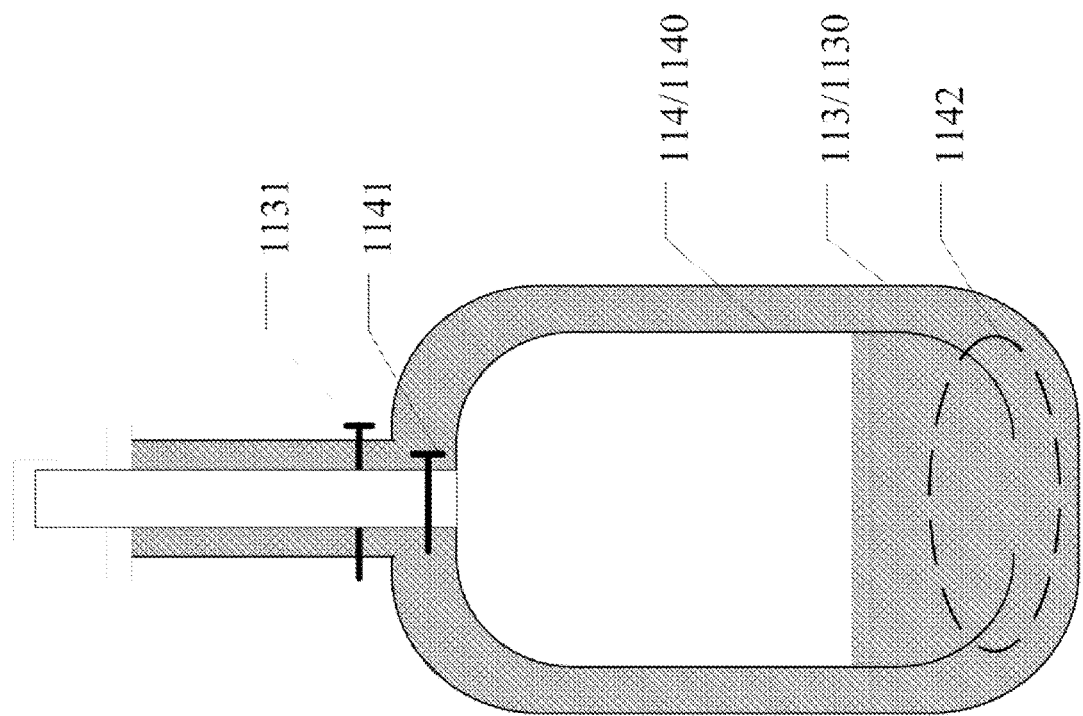
FIG. 11 is a structure diagram of the compressed gas storage unit in accordance with various embodiments of the present disclosure.

FIG. 11 is a structure diagram of the compressed gas storage unit in accordance with various embodiments of the present disclosure. As shown in FIG. 11, the compressed gas storage unit 110 includes an outer tank 113 and an inner tank 114. The inner tank 114 is inside the outer tank 113. As shown in FIG. 11, the outer tank 113 includes a first tank 1130 and a first valve 1131 on the first tank 1130. The inner tank 114 includes a second tank 1140 and a second valve 1141 disposed on the second tank 1140. The bottom of the inner tank 114 has an opening 1142 for inputting or outputting liquid. The second valve 1141 is used for inputting or outputting gas. Thus, the compressed gas storage unit can allocate the gas storage space of the stored gas and the liquid storage space of the liquid in different tanks (e.g., the outer tank and the inner tank) so as to prevent the gas and liquid from being in direct contact with the outer tank simultaneously, thereby avoiding outer tank corrosion caused by the mixture of the gas and the liquid. This structure can reduce the antioxidant requirements of the outer tank. In addition, since the pressure of the inner tank is approximately equal to the pressure of the outer tank, the material requirements of the inner tank can be easy to satisfy, thereby reducing manufacturing costs. For example, the outer tank can be made of steel, and the inner tank can be made of plastic, glass and/or other suitable materials. Of course, the compressed gas storage unit may also be modified from a gas structure or an existing natural cave, and the embodiments of the present disclosure are not limited thereto.

Figure 12:
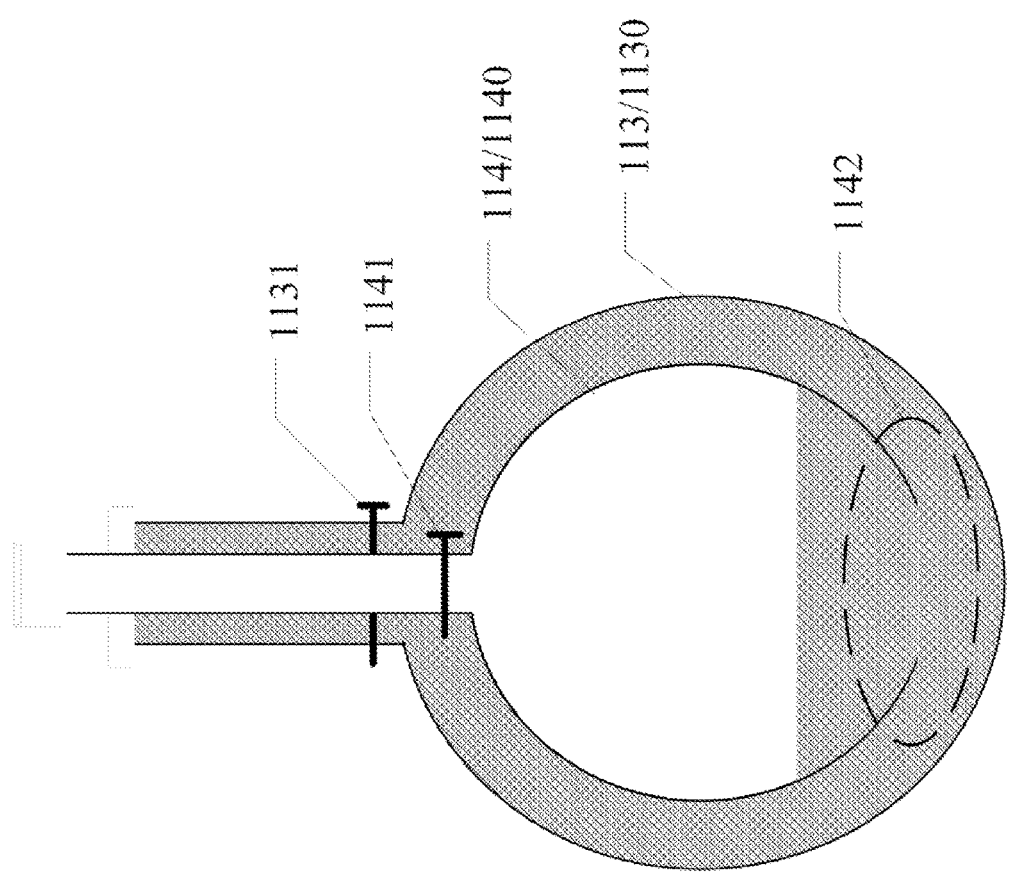
FIG. 12 illustrates a structure diagram of another compressed gas storage unit in accordance with various embodiments of the present disclosure.

FIG. 12 illustrates a structure diagram of another compressed gas storage unit in accordance with various embodiments of the present disclosure. As shown in FIG. 11, the shape of the outer tank or the inner tank may be cylindrical. As shown in FIG. 12, the shape of the outer tank and/or the shape inner tank can be spherical. The embodiments of the present disclosure are not limited thereto.

Figure 13:
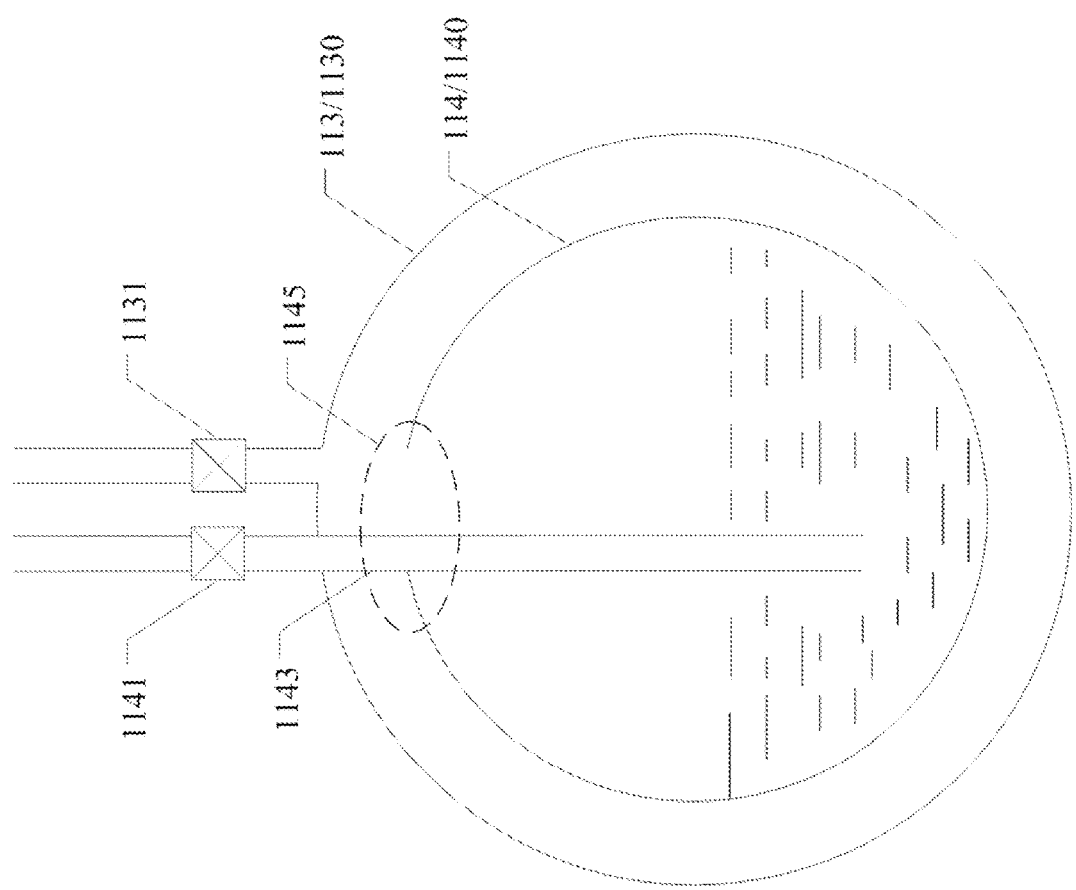
FIG. 13 illustrates a structure diagram of another compressed gas storage unit in accordance with various embodiments of the present disclosure.

FIG. 13 illustrates a structure diagram of another compressed gas storage unit in accordance with various embodiments of the present disclosure. The compressed gas storage unit 110 includes an outer tank 113 and an inner tank 114. The inner tank 114 is inside the outer tank 113. As shown in FIG. 13, the outer tank 113 further includes a first tank 1130 and a first valve 1131 on the first tank 1130. The inner tank 114 includes a second tank 1140, a liquid pipe 1143 extending into the second tank 1140 and a second valve 1141 on the liquid pipe 1143. The top of the inner tank 114 has an opening 1145 for inputting or outputting a liquid. A first valve 1131 is used for inputting or outputting gas. Thus, the compressed gas storage unit can allocate the gas storage space of the stored gas and the liquid storage space of the liquid in different tanks (e.g., the outer tank and the inner tank). The compressed gas storage unit can use caves formed by washing the salt by water in a soluble salt layer. Because the walls of the caves cannot touch the water, the above-mentioned double-layer tank (e.g., the inner tank and the outer tank) can be used to limit the liquid (e.g., water) within the inner tank so as to prevent the liquid from being in direct contact with the dissolved rock in the water-soluble salt layer and prevent the dissolved rocks from entering into the system, thereby improving the operation safety and reliability of combined gas-liquid two-phase energy storage system.

The embodiments shown in FIGS. 1-13 are alternatively referred to as a first implementation of the combined gas-liquid two-phase energy storage system.

Figure 14:
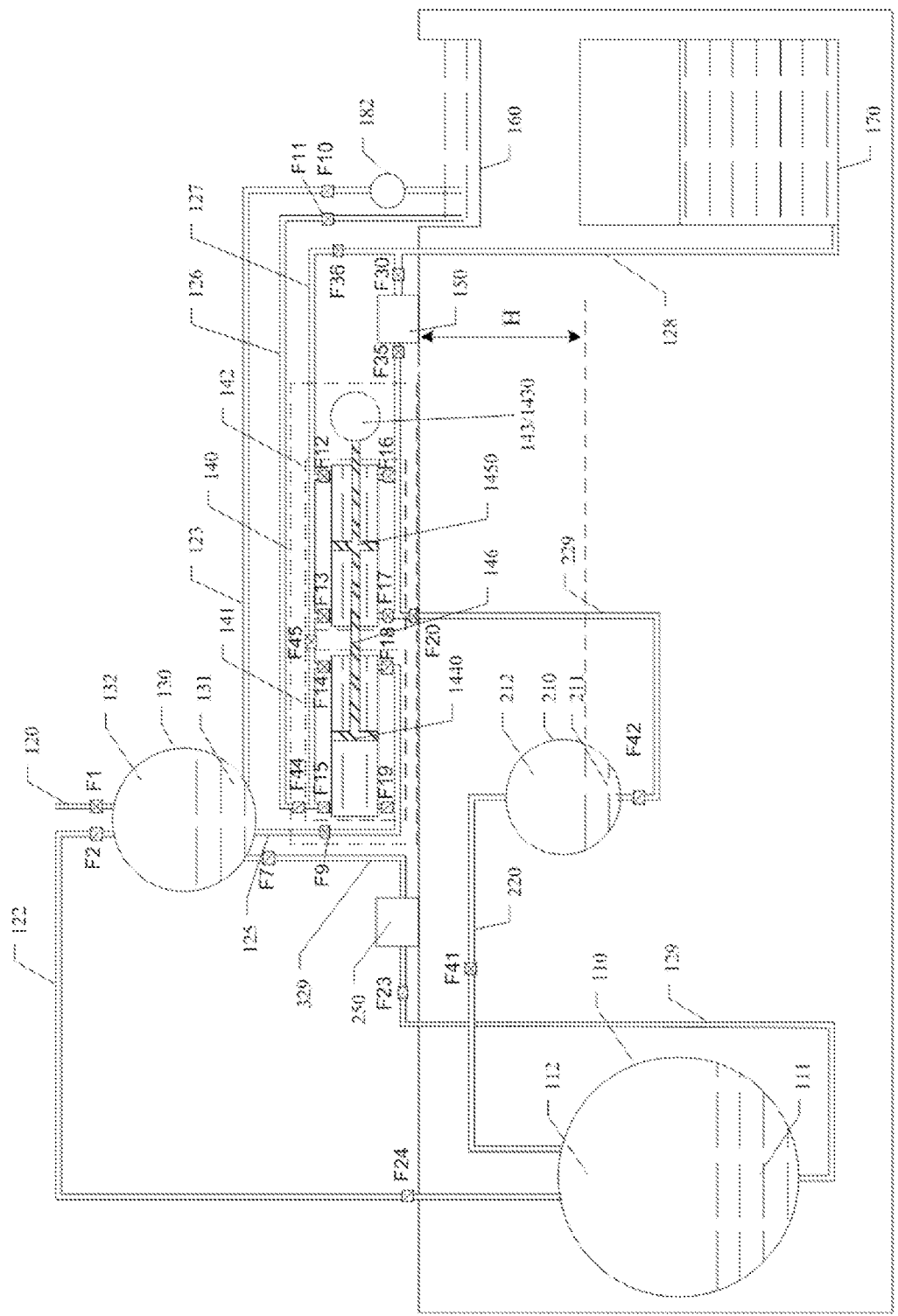
FIG. 14 shows a structure diagram of another combined gas-liquid two-phase energy storage system in accordance with various embodiments of the present disclosure.

FIG. 14 shows a structure diagram of another combined gas-liquid two-phase energy storage system in accordance with various embodiments of the present disclosure. The combined gas-liquid two-phase energy storage system shown in FIG. 14 is based upon the first implementation of the combined gas-liquid two-phase energy storage system described above. The embodiment shown in FIG. 14 is alternatively referred to as a second implementation of the combined gas-liquid two-phase energy storage system. In comparison with the embodiment of the first implementation described above, the embodiment shown in FIG. 14 further includes a first buffer tank 210, a second high-pressure liquid pipe 229 and a second gas pipe 220. As shown in FIG. 14, there is a first height difference H between the first buffer tank 210 and the first pumped power generation unit 150. The first buffer tank 210 includes a first liquid space 211 and a first gas space 212. The second high-pressure liquid pipe 229 is used for storing or transporting the high-pressure liquid. A first end of the second high-pressure liquid pipe 229 is connected to the first liquid space 211. A second end of the second high-pressure liquid pipe 229 is connected to the second port group 142. The second gas pipe 220 is used for storing or transporting the compressed gas. A first end of the second gas pipe 220 is connected to the first gas space 212. A second end of the second gas pipe 220 is connected to the gas storage space 112. In some embodiments, the pressure in the compressed gas storage unit 110 is stabilized. As a result, the pressure in the first buffer tank 210 is stabilized because the first buffer tank 210 is connected to the compressed gas storage unit 110 through the second gas pipe 220. The pressure of the second port group 142 may be adjusted by setting the height of the first buffer tank 210 with respect to the first pumped power generation unit 150 (the value of the first height difference H). As a result, a new liquid pressure may be provided when the first pumped power generation unit 150 generates electric power, and the pressure of the second port group 142 is the liquid pressure difference generated by the gas pressure within the compressed gas storage unit and the liquid pressure produced by the liquid with a height of H. It should be noted that the compressed gas storage unit can be designed according to the actual environment conditions and the required capacity, and the pressure of the compressed gas storage unit may not match the water head required by the first pumped power generation unit. By setting the above-mentioned first buffer tank, the second high-pressure liquid pipe and the second gas pipe, the liquid pressure of the second port group 142 may be adjusted to match the water head required by the first pumped power generation unit during a power generation process. It should be noted that the first buffer tank may have a structure similar to that of the compressed gas storage unit described above with respect to the first implementation of the combined gas-liquid two-phase energy storage system. As such, this structure is not described in detail herein to avoid repetition.

FIG. 14 further illustrates the combined gas-liquid two-phase energy storage system includes a second pumped power generation unit 250. As shown in FIG. 14, the second pumped power generation unit 250 is connected to the liquid storage space 111 of the liquid piston device 130, the compressed gas storage unit 110, respectively. For example, the second pumped power generation unit 250 is connected to the liquid storage space 111 through the first high-pressure liquid pipe 129. The second pumped power generation unit 250 is connected to the liquid piston device 130 through the third high-pressure liquid pipe 329. Thus, the gas isostatic migration process (the gas movement in an equal pressure manner) between the compressed gas storage unit 110 and the liquid piston device 130 can be performed through the second pumped power generation unit 250. In addition, the liquid height difference between the liquid in the liquid piston device 130 and the liquid in the liquid storage space 111 in the compressed gas storage unit 110 can be used to generate power while the compressed gas migrates from the compressed gas storage unit 110 to the liquid piston device 130 (the gas movement in an equal pressure manner from the compressed gas storage unit 110 to the liquid piston device 130). It should be noted that the pumped power generation unit 250 may be configured in a manner similar to that of the first pumped power generation unit 150, which has been described above with respect to the first implementation of the combined gas-liquid two-phase energy storage system, and hence is not discussed again to avoid repetition. It should be noted that the combined gas-liquid two-phase energy storage system can employ other methods to achieve the isostatic migration. For example, by connecting the second high-pressure liquid pipe to the second port group as described in the first implementation of the combined gas-liquid two-phase energy storage and power generation system. The combined gas-liquid two-phase energy storage and power generation system may preferentially use the second pumped power generation unit for the isostatic migration process. The embodiments of the present disclosure are not limited thereto.

FIG. 14 further illustrates the combined gas-liquid two-phase energy storage and power generation system includes valves F7, F23, F41, F42, F44 and F45. The valve F7 is placed between the liquid piston device 130 and the second pumped power generation unit 250 and on/above and the third high-pressure liquid pipe 329. The valve F23 is between the liquid storage space 111 and the second pumped power generation unit 250, and on/above the first high-pressure liquid pipe 129. The valve F41 is between the gas storage space 112 and the first gas space 212, and on/above the second gas pipe 220. The valve F42 is between the first liquid space 211 and the second port group 142, and on/above the second high-pressure liquid pipe 229. The valve F44 is between the liquid pipe 126 and the first port group 141. The valve F45 is between the valve F14 and the valve F13. The valve F20 is also between the first liquid space 211 and the second port group 142, and on/above the second high-pressure liquid pipe 229. It should be noted that the position and the relative relationship of the other components in the present implementation can be found in the related description in the first implementation of the combined gas-liquid two-phase energy storage and power generation system described above, and hence are not be described again.

The energy storage process of the combined gas-liquid two-phase energy storage system of the present embodiment includes the following steps. The valve F1 is turned open to fill the gas to be compressed in the liquid piston device 130 of the liquid piston device 130. All valves are turned closed. Assume that the hydraulic potential energy conversion unit 140 (For example, the first piston 1440 or the second piston 1450) moves to the right first (it can be moved to the left first, the embodiment is not limited thereto). The valves F9, F11, F12, F15, F17, F18, F20, F30, F35, F36, F41, F42 and F45 are turned open. The first pumped power generation unit 150 is controlled to deliver the liquid from the first liquid source 170 to the second port group 142 via the liquid pipe 128 using the energy that needs to be absorbed. In addition, under the pressure difference between the second high-pressure liquid pipe 229 and the first liquid source 170, the second piston 1450 is pushed and the first piston 1440 moves to the right by the link 146. At the same time, the first motor 1430 and the first pumped power generation unit 150 are controlled such that the inflow amount of the liquid of the first buffer tank 210 is equal to the outflow amount of the liquid of the first buffer tank 210. That is, the net liquid inflow amount of the first buffer tank 210 is approximately equal to zero, and the pressure therein is kept constant so that the pressure of the first compressed gas storage unit 110 is kept the same. Since the second piston 1450 makes the first piston 1440 move to the right through the link 146, the liquid of the first liquid source 170 is injected into the liquid piston device 130 through the liquid pipe 128, the valve F36, the liquid pipe 127, the valve F45, the valve F15, the valve F18 and the valve F9. The liquid in the liquid piston device 130 compresses the gas in the liquid piston device 130. The heat released during the gas compression process is absorbed by the liquid in the liquid piston device 130. The potential energy is stored in the gas of the liquid piston device 130. When the second piston 1450 reaches the rightmost side, the valves F12, F15, F17 and F18 are turned closed and the valves F13, F14, F16 and F19 are turned open. The first pumped power generation unit 150 continues to feed the liquid in the first liquid source 170 into the second port group 142 through the liquid pipe 128. Under the pressure difference between the second high-pressure liquid pipe 229 and the first liquid source 170, the second piston 1450 is pushed, and through the link 146, the first piston 1440 moves to the left so as to continue to compress the gas in the liquid piston device 130 by the liquid of the liquid piston device 130. The process described above (the second piston 1450 moves to the right first and then to the left) is repeated until the pressure of the compressed gas in the liquid piston device 130 reaches a predetermined value (e.g., the pressure of the compressed gas stored by the compressed gas storage unit 110). All valves are turned closed. The valves F2, F7, F23 and F24 are turned open. The gas storage space 132 of the liquid piston device 130 and the gas storage space 112 of the compressed gas storage unit 110 are connected together through the compressed gas pipe 122. The second pumped power generation unit 250 pumps the liquid of the liquid storage space 111 of the compressed gas storage unit 110 into the liquid piston device 130 so as to feed the compressed gas of the liquid piston device 130 into the gas storage space 112 of the compressed gas storage unit 110, and the second pumped power generation unit 250 makes the amount of the liquid discharged from the liquid storage space 111 approximately equal to the amount of the gas fed into the gas storage space 112 so as to ensure the pressure stability of the compressed gas storage unit. After the migration (in an equal pressure manner) of the compressed gas in the liquid piston device 130 finishes, all valves are turned closed, and then the valves F1, F10 are turned open. The second motor 182 pumps the liquid in the liquid piston device 130 into the second liquid source 160. Meanwhile, the gas to be compressed is fed into and fully occupies the liquid piston device 130 through a first gas pipe 120.

The power generation process of the combined gas-liquid two-phase energy storage and power generation system shown in FIG. 14 includes the following steps. The liquid piston device 130 is filled with liquid. All the valves are turned closed. The valves F2, F7, F23 and F24 are turned open. At this time, the liquid piston device 130 is connected to the gas storage space 112 of the compressed gas storage unit 110 through the compressed gas pipe 122. The second pumped power generation unit 250 is controlled to feed the liquid of the liquid piston device 130 into the liquid storage space 111. Furthermore, the second pumped power generation unit 250 is controlled such that the amount of the liquid into the liquid storage space 111 is equal to the amount of the gas removed from the gas storage space 112. As a result, the compressed gas stored in the gas storage space 112 is isostatically transferred into the liquid piston device 130, and the pressure of the compressed gas storage unit 110 is maintained constant. If there is a height difference between the liquid piston device 130 and the compressed gas storage unit 110, the second pumped power generation unit 250 may generate power using the height difference between the liquid piston device 130 and the compressed gas storage unit 110. After the compressed gas has been moved from the compressed gas storage unit 110 in an equal pressure manner, the valves F2, F7, F23 and F24 are turned closed. The valves F9, F12, F15, F17, F18, F20, F30, F35, F36, F41, F42 and F45 are turned open. Assuming the piston (e.g., the first piston 1440 or the second piston 1450) of the hydraulic potential energy conversion unit 140 moves to the left first. The compressed gas expands and pushes the liquid in the liquid piston device 130. While the compressed gas does work by expansion, the compressed gas can absorb the heat of the liquid, and convert the energy stored in the compressed gas into the liquid pressure potential energy in the liquid piston device 130. The liquid of the liquid piston device 130 flows through the valves F9, F18, F15, and the liquid pipe 127 into a first liquid source 170. The liquid in the first liquid source 170 flows through the liquid pipes 128, 127 and the valves F12, F17, and generates power through the first pumped power generation unit 150 under the pressure difference between the first buffer tank 210 and the first liquid source 170. By adjusting the first motor 1430, the amount of the liquid injected into the first buffer tank 210 through the second high-pressure liquid pipe 229 can be equal to the amount of the liquid flowing out of the first buffer tank 210 through the second high-pressure liquid pipe 229. After the hydraulic potential energy conversion unit 140 (e.g., the first piston 1440 or the second piston 1450) reaches the leftmost end, the valves F15, F18, F12 and F17 are turned closed, and the valves F19, F14, F16 and F13 are turned open. The piston (e.g., the first piston 1440 or the second piston 1450) of the hydraulic potential energy conversion unit 140 moves to the right to repeat the reciprocating motion of the piston of the hydraulic potential energy conversion unit 140 until the compressed gas pressure in the liquid piston device 130 is below at a certain pressure value (a predetermined value), or the liquid in the liquid piston device 130 is completely discharged from the liquid piston device 130 to the first liquid source 170.

For example, in the combined gas-liquid two-phase energy storage system provided by the example embodiment of the present embodiment shown in FIG. 14, the first liquid source 170 and the second liquid source 160 may be integrated as one single entity.

It should be noted that the connection of the first buffer tank to the compressed gas storage unit may be carried out in the following ways: 1) the first buffer tank is connected to the compressed gas storage unit through a compressor and a expander; 2) the first buffer tank is connected to the compressed gas storage unit through a piston cylinder. Of course, the connection between the first buffer tank and the compressed gas storage unit has many variations, and is not limited to the above-described implementations.

Figure 15:
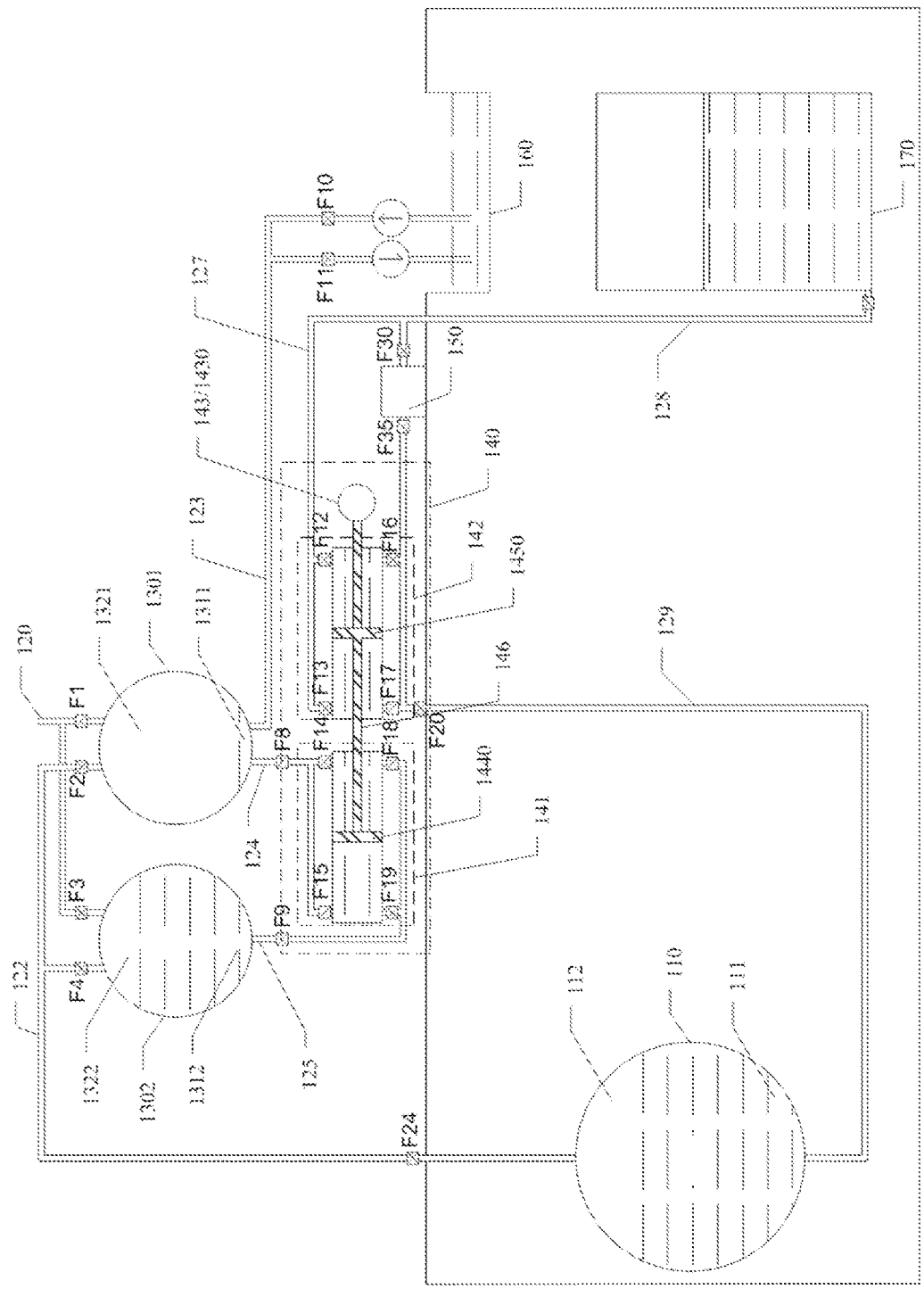
FIG. 15 shows a structure diagram of another combined gas-liquid two-phase energy storage system in accordance with various embodiments of the present disclosure.

FIG. 15 shows a structure diagram of another combined gas-liquid two-phase energy storage system in accordance with various embodiments of the present disclosure. The combined gas-liquid two-phase energy storage system shown in FIG. 15 is based upon the first implementation of the combined gas-liquid two-phase energy storage system described above. The embodiment shown in FIG. 15 is alternatively referred to as a third implementation of the combined gas-liquid two-phase energy storage system.

As shown in FIG. 15, the liquid piston device 130 includes a first sub-liquid piston device 1301 and a second sub-liquid piston device 1302. The first sub-liquid piston device 1301 and the second sub-liquid piston device 1302 are connected to the first gas pipe 120 and the compressed gas storage unit 110 respectively. The first sub-liquid piston device 1301 is connected to the first port group 141 and the second liquid source 160. The second sub-liquid piston device 1302 is connected to the first port group 141. Thus, the first sub-liquid piston device 1301 and the second sub-liquid piston device 1302 can be connected together through the first port group 141 so that the liquid can repeatedly flow between the first sub-liquid piston device 1301 and the second sub-liquid piston device 1302. The liquid flowing between the first sub-liquid piston device 1301 and the second sub-liquid piston device 1302 compresses the gases in the first sub-liquid piston device 1301 and the second sub-liquid piston device 1302, respectively.

For example, in the combined gas-liquid two-phase energy storage system shown in FIG. 15, the combined gas-liquid two-phase energy storage system includes valves F3, F4, and F8. A valve F1 is provided between the first gas pipe 120 and the first sub-liquid piston device 1301. A valve F3 is provided between the first gas pipe 120 and the second sub-liquid piston device 1302. A valve F2 is provided between the compressed gas pipe 122 and the first sub-liquid piston device 1301. A valve F4 is disposed between the compressed gas pipe 122 and the second sub-liquid piston device 1302. In addition, the liquid pipe 125 is connected to the second sub-liquid piston device 1302. The liquid pipe 124 is connected to the first sub-liquid piston device 1301. The position and relative relationship of the other components of the present embodiment can be found in the related description with respect to the first embodiment, and hence are not discussed again herein to avoid repetition.

The energy storage process of the combined gas-liquid two-phase energy storage system shown in FIG. 15 includes the following steps. A predetermined amount of gas is stored in the first sub-liquid piston device 1301. The second sub-liquid piston device 1302 is fully filled with liquid. All valves are turned closed. The valves F3, F8, F9, F12, F14, F17, F19, F20, F30 and F35 are turned open. The second sub-liquid piston device 1302 is connected with the first gas pipe 120. Assuming that the piston of the hydraulic potential energy conversion unit 140 (e.g., the first piston 1440 or the second piston 1450) moves to the right first. The first pumped power generation unit 150 consumes electrical energy to deliver the liquid from the first liquid source 170 to the second port group 142 through the liquid pipe 128. The pressure difference between the first high-pressure liquid pipe 129 and the first liquid source 170 pushes the second piston 1450. Through the connection with the link 146, the second piston 1450 drives the first piston 1440 to move to the right. At the same time, by controlling the first motor 1430 and the first pumped power generation unit 150, the liquid inflow amount of the compressed gas storage unit 110 is equal to the outflow amount of the compressed gas storage unit 110 so as to maintain that the pressure of the compressed gas storage unit 110 constant. Since the second piston 1450 drives the first piston 1440 to move rightward through the link 146, the liquid in the second sub-liquid piston device 1302 is injected into the first sub-liquid piston device 1301 through the liquid pipe 125, the valves F9 F19, F14 and the liquid pipe 124. The liquid in the first sub-liquid piston device 1301 compresses the gas in the first sub-liquid piston device 1301. The heat generated in the process of compressing the gas is absorbed by the liquid. The potential energy is stored in the gas, and the heat energy is stored in the liquid. When the piston (e.g., the first piston 1440 or the second piston 1450) of the hydraulic potential energy conversion unit 140 reaches the rightmost position of the hydraulic potential energy conversion unit 140, the valves F12, F14, F17 and F19 are turned closed, and the valves F13, F16, F15 and F18 are turned open. At the same time, the piston of the hydraulic potential energy conversion unit 140 moves to the left to continue the process of compressing the gas in the first sub-liquid piston device 1301. The piston of the hydraulic potential energy conversion unit 140 moves in a reciprocating motion until the pressure of the compressed gas in the first sub-liquid piston device 1321 is substantially equal to the gas pressure in the compressed gas storage unit 110. At this time, the valves F2 and F24 are turned open. The first sub-liquid piston device 1301 and the gas storage space 112 of the compression gas storage unit 110 are connected together through the compressed gas pipe 122. The liquid of the second sub-liquid piston device 1302 is injected into the first sub-liquid piston device 1301 through the liquid pipe 125, the valves F9, F19, F14 and the liquid pipe 124 so that the compressed gas in the first sub-liquid piston device 1301 migrates into the compressed gas storage unit 110 in an equal pressure manner. The amount of liquid discharged from the compressed gas storage unit 110 is controlled by adjusting the first motor 1430. The liquid intake amount of the compressed gas storage unit 110 is controlled by adjusting the pumped power generation unit 150 so that the amount of liquid discharged from the compressed gas storage unit 110 is equal to the sum of the intake amount of liquid and the intake amount of gas. As a result, the pressure of the compression gas storage unit 110 is maintained constant. After the compressed gas in the first sub-liquid piston device 1301 has been moved in the equal pressure manner, the first sub-liquid piston device 1301 is filled with liquid, and the second sub-liquid piston device 1302 is filled with gas to be compressed. All values are turned closed, and then the valves F1, F8, F9, F12, F14, F17, F19, F20, F30 and F35 are turned open. The piston of the hydraulic potential energy conversion unit 140 (for example, the first piston 1440 and the second piston 1450) moves to the left first, and then the valves F12, F15, F17 and F19 are turned closed, and the valves F13, F16, F15 and F18 are turned open. Such a configuration makes the piston of the hydraulic potential energy conversion unit 140 move to the right. The process above is repeated so that the liquid in the first sub-liquid piston device is drawn into the second sub-liquid piston device. After the liquid in the first sub-liquid piston device 1301 reaches a certain temperature, the liquid of the first sub-liquid piston device 1301 can have a heat exchange with the second liquid source 160 through the liquid pipe 123 and a bi-directional water pump. It should be noted that during the above energy storage process, the first sub-liquid piston device and the second sub-liquid piston device can alternately compress the gas, thereby reducing the time for completely removing the liquid from the liquid piston devices (e.g., the first sub-liquid piston device or the second sub-liquid piston device) and filling the gas to be compressed in the liquid piston devices (e.g., the first sub-liquid piston device or the second sub-liquid piston device). For example, the gas in the second sub-liquid piston device can be immediately compressed after the first sub-liquid piston device has completed the gas compression and the isobaric migration process (moving between two devices in an equal pressure manner), thereby improving the storage efficiency of the combined gas-liquid two-phase energy storage and power generation system. In addition, the liquid can continuously compress the gas between the first sub-liquid piston device and the second sub-liquid piston device to absorb heat and gradually raise the temperature so as to enhance the energy quality (high temperature) of the liquid, which can be used twice (reuse the heat). For example, the high temperature liquid can be used for residential heating or power generation, thereby improving the power generation efficiency of the combined gas-liquid two-phase energy storage and power generation system.

The power generating process of the combined gas-liquid two-phase embodiment power generation energy storage system shown in FIG. 15 includes the following steps. The first sub-liquid piston device 1301 is filled with liquid. All valves are turned closed, and then the valves F2, F3, F8, F9, F13, F15, F16 F18, F20, F24, F30 and F35 are turned open. At this time, the first sub-liquid piston device 1301 is connected with the gas storage space 112 of the compressed gas storage unit 110 through the compressed gas pipe 122. The second sub-liquid piston device 1302 is connected to the first gas pipe 120. Assuming the piston of the hydraulic potential energy conversion unit 140 (e.g., the first piston 1440 or the second piston 1450) moves to the right first. The liquid in the first sub-liquid piston device 1301 flows into the second sub-liquid piston device 1302 through the liquid pipe 124, the valves F8, F15, F18, F9 and the liquid pipe 125. The liquid in the first liquid source 170 flows into the compressed gas storage unit 110 through the liquid pipe 128, the liquid pipe 127, the valves F13, F16 and the first high-pressure liquid pipe 129. The liquid in the compressed gas storage unit 110 generates power under the pressure difference between the compressed gas storage unit 110 and the first liquid source 170 through the first pumped power generation unit 150. By adjusting the first motor 1430, the amount of the liquid injected into the compressed gas storage unit 110 through the first high-pressure liquid pipe 129 is equal to the sum of the amount of the liquid flowing out of the compressed gas storage unit 110 and the amount of the compressed gas moved out of the compressed gas storage unit 110 so that the compressed gas migrates from compressed gas storage unit 110 to the first sub-liquid piston device 1301 in an equal pressure manner. After the migration of the desired amount of the compressed gas from the compressed gas storage unit 110, the valves F2 and F24 are turned closed. The compressed gas in a first sub-liquid piston device 1301 expands and pushes the liquid in the first sub-liquid piston device 1301. In addition, the compressed gas absorbs the heat of the liquid during the process of doing work by expansion, and converts the energy stored in the compressed gas into the hydraulic potential energy of the liquid in the first sub-liquid piston device 1301. The liquid in the first sub-liquid piston device 1301 flows into the second sub-liquid piston device 1302 through the liquid pipe 124, the valves F8, F15, F18, and the liquid pipe 125. The liquid in the first liquid source 170 flows through the liquid pipe 128, the liquid pipe 127 and the valves F13, F16, and generates power through the pumped power generation unit 150 under the pressure difference between the first pumped power stored in the compressed gas storage unit 110 and the first liquid source 170. At this time, by adjusting the first motor 1430, the amount of the liquid injected into the compressed gas storage unit 110 through the first high-pressure liquid pipe 129 can be equal to the amount of the liquid flowing out of the compressed gas storage unit 110 so as to maintain the pressure of the compressed gas storage unit 110 stable. After the piston of the hydraulic potential energy conversion unit 140 (e.g., the first piston 1440 or the second piston 1450) reaches the rightmost point, the valves F15, F18, F13 and F16 are turned closed and the valves F14, F19, F12 and F17 are turned open. The liquid in the first sub-liquid piston device 1301 flows into the second sub-liquid piston device 1302 through the liquid pipe 124, the valves F8, F14, F19 and the liquid pipe 125. The liquid in the first liquid source 170 flows through the liquid pipe 128, the liquid pipe 127 and the valves F12, F17, and generates power through the pumped power generation unit 150 under the pressure difference between the compressed gas storage unit 110 and the first liquid source 170. At this time, the piston of the hydraulic potential energy conversion unit 140 (e.g., the first piston 1440 or the second piston 1450) moves to the left. The reciprocating motion of the hydraulic potential energy conversion unit is repeated until the pressure of the compressed gas in the first sub-liquid piston device 1301 is below a predetermined value, or the liquid in the first sub-liquid piston device 1301 is completely transferred to the second sub-liquid piston device 1302. At this time, the second sub-liquid piston device 1302 is filled with the liquid. All valves are turned closed, and then the valve F1, F4, F8, F9, F12, F15, F17, F18, F20, F30 and F35 are turned open. At this time, the second sub-liquid piston device 1302 is connected with the gas storage space 112 of the compressed gas storage unit 110 through the compressed gas pipe 122. The first sub-liquid piston device 1301 is connected to the first gas pipe 120. The piston of the hydraulic potential energy conversion unit 140 moves to the left and allows the compressed gas of the gas storage space 112 to migrate into the second sub-liquid piston device 1302 in an equal pressure manner, and then generate power in the second sub-liquid piston device 1302 through a process of doing work by expansion. After that, the valves F12, F15, F17 and F18 are turned closed, and the valves F13, F16, F14 and F19 are turned open. The piston of the hydraulic potential energy conversion unit 140 moves leftward to continue the operation of making the compressed gas of the gas storage space 112 perform power generation in the second sub-liquid piston device 1302 by a process of doing work by expansion. The reciprocating motion of the piston of the hydraulic potential energy conversion unit is repeated until the pressure of the compressed gas in the second sub-liquid piston device 1302 is below a certain pressure value, or the liquid of the second sub-liquid piston device 1302 is completely transferred to the first sub-liquid piston device 1301. It should be noted that the specific process of the compressed gas in the second sub-liquid piston device is similar to that in the first sub-liquid piston device, and hence is not repeated herein. In the power generation process described above, the compressed gas can alternately do work by expansion in the first sub-liquid piston device and the second sub-liquid piston device while simultaneously filling the first sub-liquid piston device and the second sub-liquid piston device with the liquid. As a result, the time for filling the liquid piston device (the first sub-liquid piston device or the second sub-liquid piston device) is reduced, thereby improving the power generation efficiency of the combined gas-liquid two-phase energy storage system.

Figure 16:
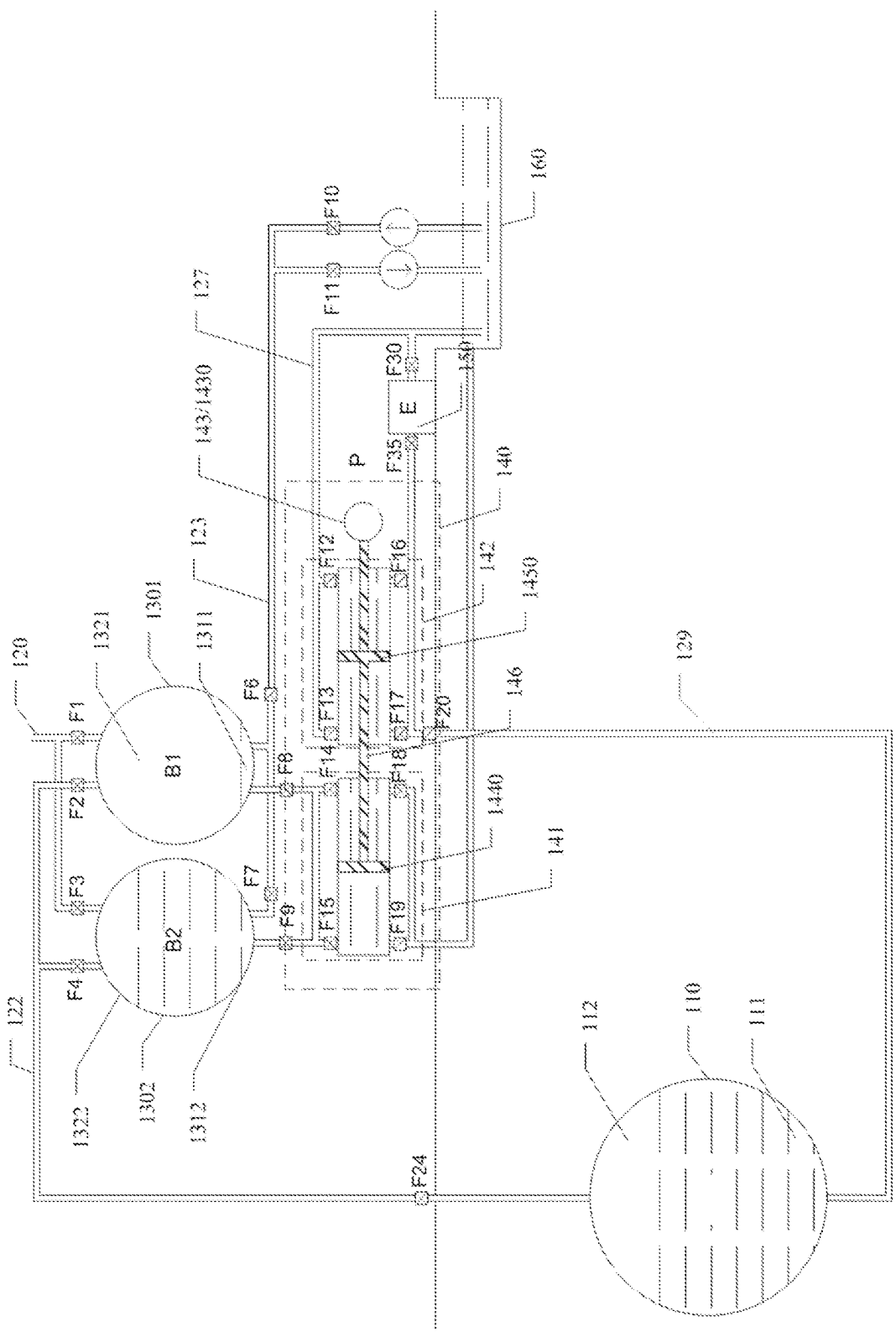
FIG. 16 shows a structure diagram of another combined gas-liquid two-phase energy storage system in accordance with various embodiments of the present disclosure.

FIG. 16 shows a structure diagram of another combined gas-liquid two-phase energy storage system in accordance with various embodiments of the present disclosure. The combined gas-liquid two-phase energy storage system shown in FIG. 16 is based upon the first implementation of the combined gas-liquid two-phase energy storage system described above. The embodiment shown in FIG. 16 is alternatively referred to as a fourth implementation of the combined gas-liquid two-phase energy storage system.

As shown in FIG. 16, the liquid piston device may include a plurality of sub-liquid piston devices. A sub-liquid piston device is connected to a first gas pipe and a compressed gas storage unit, respectively. Another sub-liquid piston device is connected to the first port group and the second liquid source, respectively. That is, the plurality of sub-liquid piston devices is connected in parallel.

For example, as shown in FIG. 16, the liquid piston device may include a first sub-liquid piston device 1301 and a second sub-liquid piston device 1302. The first sub-liquid piston device 1301 and the second sub-liquid piston device 1302 are connected to the first gas pipe 120 and the compressed gas storage unit 110, respectively. The first sub-liquid piston device 1301 and the second sub-liquid piston device 1302 are connected to the first port group 141 and the second liquid source 160, respectively. Thus, the first sub-liquid piston device 1301 and the second sub-liquid piston device 1302 can operate independently to improve the energy storage and efficiency of the combined gas-liquid two-phase energy storage system without increasing the capacity of the sub-liquid piston devices. It should be noted that the first sub-liquid piston device 1301 and the second sub-liquid piston device 1302 may operate in a time-sharing manner to continuously perform energy storage and power generation. For example, during the energy storage process, the second sub-liquid piston device 1302 discharges the liquid into the second liquid source 160 and simultaneously pre-sets the gas to be compressed when the first sub-liquid piston device 1301 compresses the gas or performs the isobaric migration process. During the power generation process, when the compressed gas does work by expansion in the first sub-liquid piston device 1301 or operates in the gas isobaric migration process, the liquid at a desired temperature can be injected from the second liquid source 160 to the second sub-liquid piston device 1302 and the gas to be compressed in the second sub-liquid piston device 1302 is discharged for preparing the next gas isobaric migration process from the compressed gas storage unit 110. It should be noted that the liquid piston device may further comprise two or more sub-liquid piston devices, and the embodiments of the present disclosure are not limited thereto. In addition, the valves and the liquid pipes in the present embodiment can be set according to actual needs, and the embodiments of the present disclosure do not describe them in detail for avoiding unnecessary repetition.

For example, in the combined gas-liquid two-phase energy storage system provided in the example embodiment of the present embodiment, the second liquid source 160 and the first liquid source 170 may be combined into one single entity. As a result, the area occupied by the combined gas-liquid two-phase energy storage system can be reduced.

Figure 17:
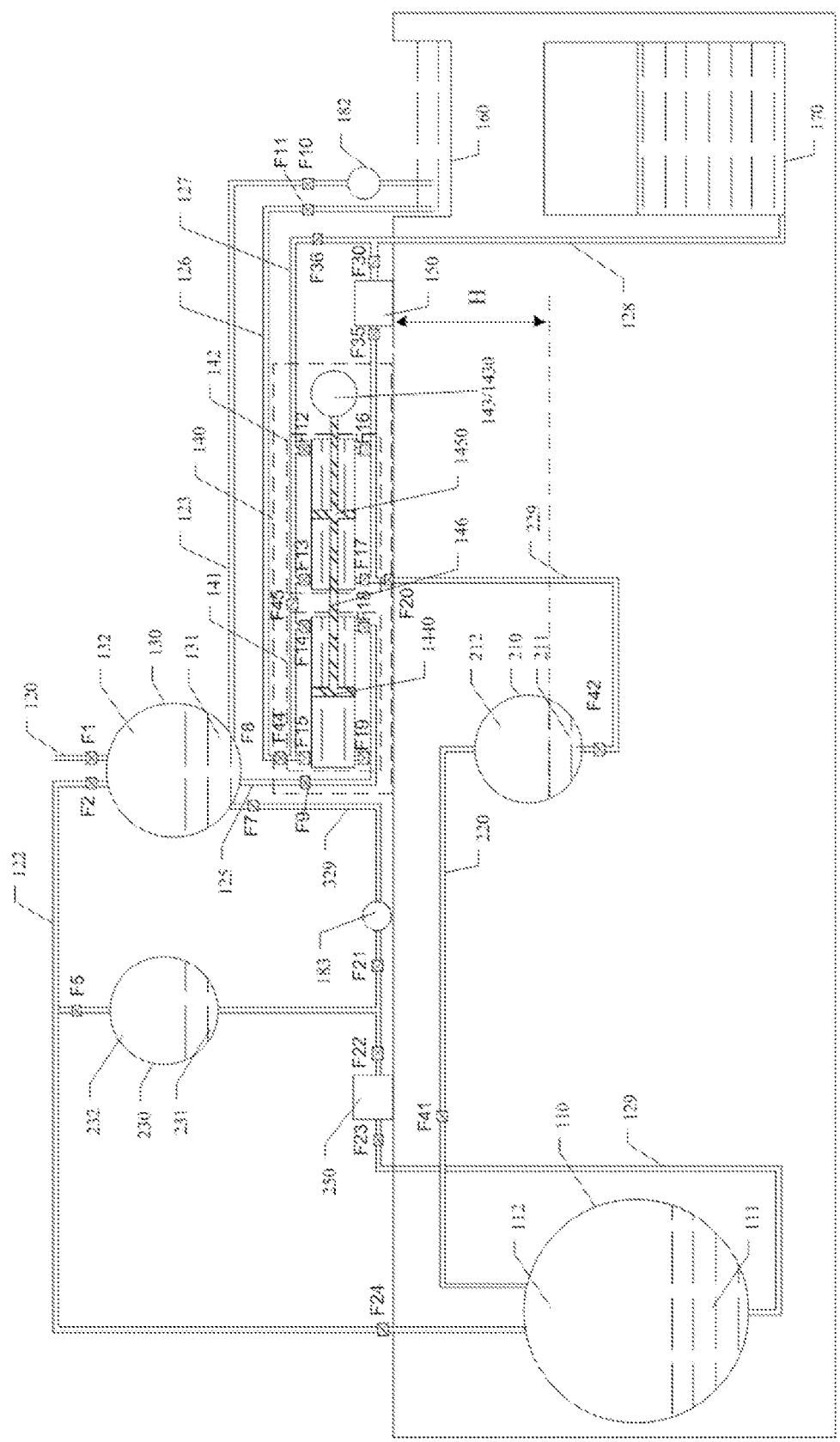
FIG. 17 shows a structure diagram of another combined gas-liquid two-phase energy storage system in accordance with various embodiments of the present disclosure.

FIG. 17 shows a structure diagram of another combined gas-liquid two-phase energy storage system in accordance with various embodiments of the present disclosure. The combined gas-liquid two-phase energy storage system shown in FIG. 17 is based upon the second implementation of the combined gas-liquid two-phase energy storage system described above. The embodiment shown in FIG. 17 is alternatively referred to as a fifth implementation of the combined gas-liquid two-phase energy storage system.

As shown in FIG. 17, the combined gas-liquid two-phase energy storage system further includes a second buffer tank 230. The second buffer tank 230 includes a second liquid space 231 and a second gas space 232. The second liquid space 231 is connected to the liquid storage space 111 through a second pumped power generation unit 250. The second liquid space 231 is connected to the liquid piston device 130 through a third motor 183. The second gas space 232 is connected to the liquid piston device 130 and the gas storage space 112, respectively. Thus, when the combined gas-liquid two-phase energy storage system stores energy, the second pumped power generation unit 250 consumes power to feed the liquid of the liquid storage space 111 of the compressed gas storage unit 110 into the second buffer tank 230. At this time, the compressed gas in the second buffer tank 230 can be transferred to the gas storage space 112 of the compressed gas storage unit 110 where the electric energy is converted into the potential energy of the liquid. At the same time, the compressed gas in the liquid piston device 130 can be transferred to the second buffer tank 230. The compressed gas in the second buffer tank 230 can be continuously transferred to the gas storage space 112 of the compressed gas storage unit 110 by controlling the flow of compressed gas into and out of the second buffer tank 230 so as to make the second pumped power generation unit 250 continuously operate. When the combined gas-liquid two-phase power storage system generates electric power, the second pumped power generation unit 250 can generate electric power by utilizing the pressure difference between the liquid of the second buffer tank 230 and the liquid in the liquid storage space 111 of the compressed gas storage unit 110. The liquid in the second buffer tank 230 enters the compressed gas storage unit 110, and the compressed gas in the compressed gas storage unit 110 is transferred to the second buffer tank 230. The liquid in the liquid piston device 130 enters the second buffer tank 230. The compressed gas in the second buffer tank 230 migrates into the liquid piston device 130 and does work by expansion.

It should be noted that the present disclosure is not limited to the position and/or relative position between the compressed gas storage unit, the second buffer tank and the liquid piston device. The positional relationship between the first buffer tank and the first pumped power generation unit is not limited. When the difference between the height of the compressed gas storage unit and the second buffer tank or the liquid piston is small, the second pumped power generation unit can be realized by a liquid pump (e.g., a water pump).

Figure 18:
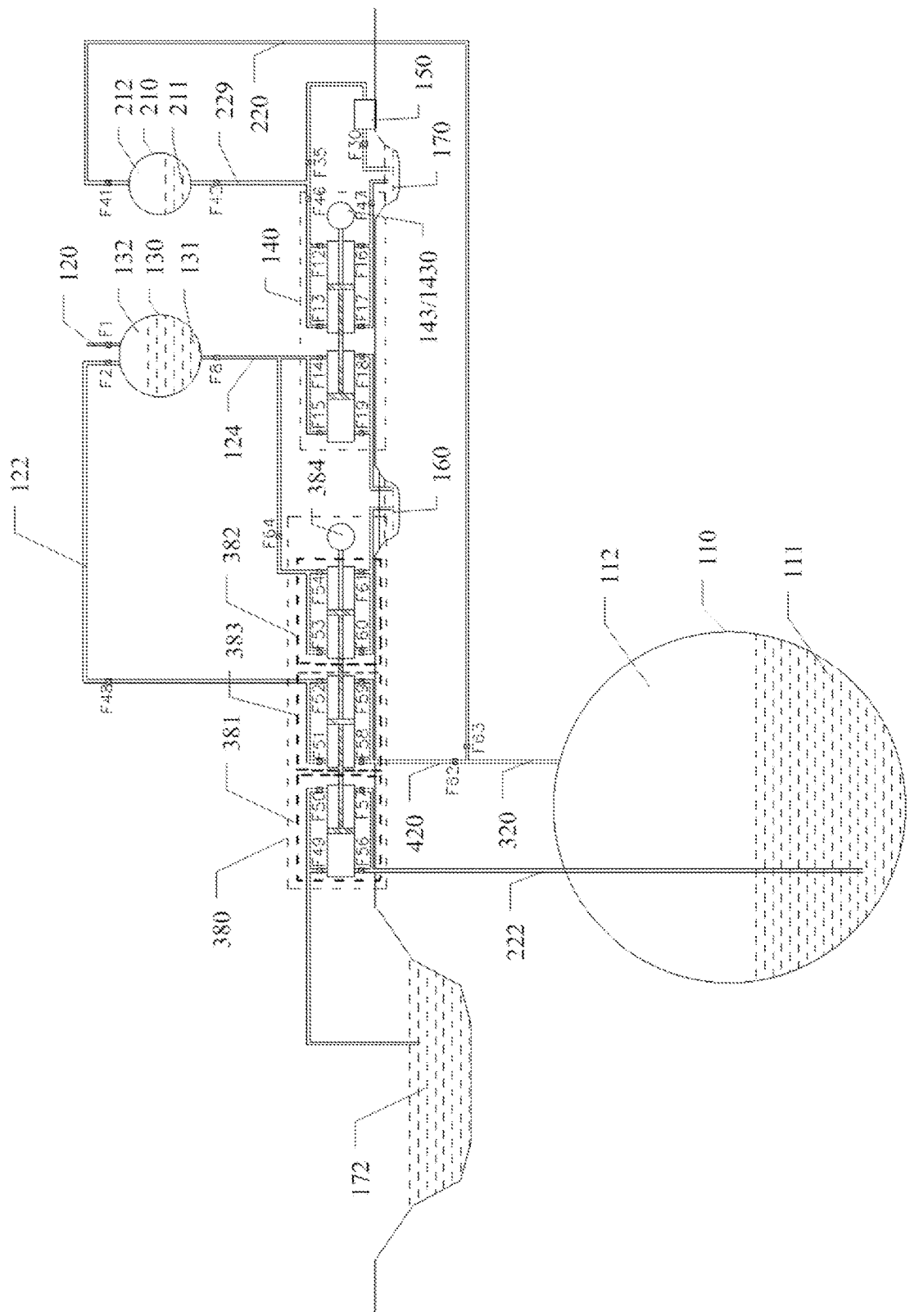
FIG. 18 is a structure diagram of another combined gas-liquid two-phase combined energy storage and power generation system in accordance with various embodiments of the present disclosure.

FIG. 18 is a structure diagram of another combined gas-liquid two-phase combined energy storage and power generation system in accordance with various embodiments of the present disclosure. The combined gas-liquid two-phase energy storage system shown in FIG. 18 is based upon the first implementation of the combined gas-liquid two-phase energy storage system described above. The embodiment shown in FIG. 18 is alternatively referred to as a sixth implementation of the combined gas-liquid two-phase energy storage system.

As shown in FIG. 18, the combined gas-liquid two-phase energy storage system includes a mixed gas-liquid potential energy conversion unit 380, a third liquid port group 381, a fourth liquid port group 382, a gas port group 383, a control unit 384 and a third liquid source 172 configured to deliver liquid to the compressed gas storage unit 110 or receive the liquid discharged from the compressed gas storage unit 110. The third liquid port group 381 is connected to the liquid storage space 111 and the third liquid source 172, respectively. The fourth liquid port group 382 is connected to the liquid piston device 130 and the second liquid source 160, respectively. The gas port group 383 is connected to the gas storage space 112 and the liquid piston device 130, respectively. The control unit 384 is configured to control the potential energy conversion rate of the mixed gas-liquid potential energy conversion unit 380 to balance the potential energy of the third liquid port group 381, the fourth liquid port group 382 and the gas port group 383 so as to transfer the compressed gas in an equal density manner between the liquid piston device 130 and the compressed gas storage unit 110 although the temperature and pressure of the compressed gas in the liquid piston device 130 may be not equal to the temperature and pressure of the compressed gas in compressed gas storage unit 110. It should be noted that the equal density transfer means that the ratio of the temperature to the pressure of the compressed gas before and after the transfer between the liquid piston device and the compressed gas storage unit is constant. That is, the gas density is constant. Under the hydraulic pressure difference between the compressed gas storage unit and the third liquid source, and the hydraulic pressure difference between the liquid piston device and the second liquid source, the connecting rod of the mixed gas-liquid potential energy conversion unit is driven. The third liquid port group injects the liquid into the compressed liquid storage unit from the third liquid source. The fourth liquid port group injects the liquid in the second liquid source into the liquid piston device so that the compressed gas migrates from the liquid piston device through the gas port group to the compressed gas storage unit for storing energy in an equal density manner. On the other hand, the first liquid cylinder pumps the liquid from the compressed gas storage unit and injects the liquid into the second liquid source. The second liquid cylinder feeds the liquid in the liquid piston device into the third liquid source so that the compressed gas migrates from the compressed gas storage unit to the liquid piston device through the gas cylinder in an equal density manner.

For example, as shown in FIG. 18, the energy storage process of the combined gas-liquid two-phase energy storage system includes the following steps. The gas is pre-set or stored in the liquid piston device 130. All valves are turned closed, and valves F8, F13, F14, F16, F19, F30, F35, F41, F42, F46, F47 and F63 are turned open. Assuming that the piston (e.g., the first piston 1440 or the second piston 1450) of the hydraulic potential energy conversion unit 140 moves to the right first. The first pumped power generation unit 150 consumes electrical energy to deliver the liquid from the first liquid source 170 to the second port group and push the piston of the hydraulic potential energy conversion unit 140. Under the pressure difference between the second high-pressure liquid pipe 229 and the first liquid source 170, the piston of the hydraulic potential energy conversion unit 140 is pushed to the right. The liquid in the second liquid source 160 is injected into the liquid piston device 130 through the valves F19, F14 and F8. The heat released from the gas compressing process is absorbed by the liquid. The potential energy is stored in the gas. The heat energy is stored in the liquid. By controlling the first motor 1430 and the first pumped power generation unit 150, the amount of liquid out of the first buffer tank is equal to the amount of liquid into the first buffer tank so as to maintain the pressure of the compressed gas storage unit 110 constant. When the piston of the hydraulic potential energy conversion unit 140 (e.g., the first piston 1440 or the second piston 1450) reaches the rightmost side, the valves F13, F14, F16 and F19 are turned closed and the valves F12, F15, F17 and F18 are turned open. At this time, the piston of the hydraulic potential energy conversion unit 140 moves to the left so as to continue to compress the gas in the liquid piston device 130. The piston of the hydraulic potential energy conversion unit 140 repeats the reciprocating motion described above until the compressed gas pressure in the liquid piston device 130 is substantially equal to the gas pressure in the compressed gas storage unit 110. At this time, all valves are turned closed, and then the valves F2, F8, F64, F48, F62, F54, F60, F50, F51, F56 and F59 are turned open. Assuming that the piston of the mixed gas-liquid potential energy conversion unit 380 moves to the right first. By controlling the control unit 384, the liquid in the compressed gas storage unit 110 is injected into the third liquid source 172 through the liquid pipe 222 and the valves F56, F50. The liquid in the second liquid source 160 is injected into the liquid piston device 130 through valves F60, F54, F64 and F8. The compressed gas of the liquid piston device 130 is fed into the compressed gas storage unit 110 through the valve F2, the gas pipe 122 and the valves F48, F51, F59 and F62. By controlling the control unit 384, the amount of the liquid flowing out of the compressed gas storage unit 110 is substantially equal to the amount of gas fed into the compressed gas storage unit 110 so as to maintain the pressure in the compressed gas storage unit 110 stable. After the compressed gas in the liquid piston device 130 has finished the migration in an equal pressure manner, the process described above is repeated to continue the energy storage process.

For example, as shown in FIG. 18, the power generation process of the combined gas-liquid two-phase energy storage and power generation system includes the following steps. The liquid piston device 130 is filled with the liquid. All valves are turned closed, and then the valves F2, F8, F48, F49, F52, F53, F57, F58, F61, F62 and F64 are turned open. At this time, the liquid piston device 130 is connected with the gas storage space 112 of the compressed gas storage unit 110 through the gas pipe 122, the gas cylinder of the mixed gas-liquid potential energy conversion unit 383, the gas pipe 420 and the gas pipe 320. Assuming that the hydraulic potential energy conversion unit 140 (e.g., the first piston 1440 or the second piston 1450) moves to the right first. The piston of the mixed gas-liquid potential energy conversion unit 380 moves to the right first. The control unit 384 controls the mixed gas-liquid potential energy conversion unit 380 to inject the liquid of the third liquid source 172 into the compressed gas storage unit 110 through the valves F49, F57 and the liquid pipe 222. The compressed gas in the compressed gas storage unit 110 is fed into the liquid piston device 130 through the gas pipe 320, the valves F62, F58, F52, the gas pipe 122 and the valves F48, F2. The liquid in the liquid piston device 130 flows into the second liquid source 160 through the valves F8, F64, F53 and F61. After the piston of the mixed gas-liquid potential energy conversion unit 380 reaches the rightmost side, valves F49, F57, F52, F58, F53 and F61 are turned closed, and valves F50, F56, F51, F59, F54 and F60 are turned open. The piston of the mixed gas-liquid potential energy conversion unit 380 moves to the left. By adjusting the control unit 384, the amount of the liquid injected into the compressed gas storage unit 110 through the liquid pipe 222 is substantially equal to the amount of the compressed gas out of the compressed gas storage unit 110 so that the pressure of the compressed gas storage unit 110 remains constant. After the compressed gas of the compressed gas storage unit 110 has been moved out in an equal density manner, all valves are turned closed, and then the valves F8, F15, F18, F12, F17, F41, F42, F63, F46, F47, F35 and F30 are turned open. The compressed gas in the compressed gas storage unit 110 provides a steady pressure to the first buffer tank 210 through the gas pipe 320 and the valves F63, F41. Such a steady pressure means a stable water head for the first pumped power generation unit 150. The compressed gas expands in the liquid piston device 130 and pushes the liquid in the liquid piston device 130 to do work, which makes the piston of the hydraulic potential energy conversion device move to the right. In addition, the compressed gas absorbs the heat of the liquid during the process of doing work by expansion. The liquid in the liquid piston device 130 flows into the second liquid source 160 through the liquid pipe 124 and the valve F8, F15, F18. The liquid in the first liquid source 170 flows through and generates power in the first pumped power generation unit 150 through the valves F47, F17, F12, F46 and F35, and flows back to the first liquid source 170 through the valve F30. After the piston of the hydraulic potential energy conversion unit 140 reaches the rightmost end, the valves F15, F18, F17 and F12 are turned closed, and the valves F14, F19, F13 and F16 are turned open. The piston of the hydraulic potential energy conversion unit 140 moves to the left and continues to make the compressed gas in the liquid piston device 130 generate power through doing work by expansion. The reciprocating motion of the piston of the hydraulic potential energy conversion unit described above is repeated until the pressure of the compressed gas in the liquid piston device 130 is lower than a certain pressure value or the liquid in the liquid piston device 130 is completely transferred to the second liquid source 160.

It should be noted that in the energy storage process described above, the pressure of the compressed gas in the liquid piston device 130 is P1. The temperature of the compressed gas in the liquid piston device 130 is T1. The gas pressure in the compressed gas storage unit 110 is P2. The temperature of the compressed gas storage unit 110 is T2. P1 and P2 are not necessarily equal. T1 and T2 are not necessarily equal. During the gas migration of the energy storage process, the compressed gas having a pressure of P1 and a temperature of T1 becomes a compressed gas having a pressure of P2 and a temperature of T2 through the gas cylinder of the mixed gas-liquid potential energy conversion unit 380 and migrates to the compressed gas storage unit 110. P1, T1, P2 and T2 can satisfy P1/T1=P2/T2. That is, the compressed gas migrates in an equal density manner. During the power generation process, the compressed gas having a pressure of P2 and a temperature of T2 becomes a compressed gas having a pressure of P1 and a temperature of T1 through the gas cylinder of the mixed gas-liquid potential energy conversion unit 380 and moves into the liquid piston device.

The system operation can be divided into three processes, namely a first process, a second process and a third process. The first process is a process of storing energy and generating power where the first pumped power generation unit utilizes the potential energy of the first port group of the hydraulic potential energy conversion unit. The second process is a process where the gas in the liquid piston device is in a compression process or an expansion process. The third process is a process where the compressed gas migrates between the compressed gas storage unit and the liquid piston devices. The above three processes can use different liquid sources. For example, in the first process, because the compressed gas storage unit is usually implemented as an underground structure having large size and requiring a large amount of liquid to ensure that the liquid stored in the compressed gas storage unit having a constant temperature and a constant pressure, the liquid quality requirements of the first process are low. As such, ordinary liquids can be used in the first process. In the second process, the gas in the liquid piston device is in a compression process and/or an expansion process. During the second process, the volume of the liquid is small. However, if the liquid is used to control the temperature of the gas, the liquid is required to have a higher heat capacity. As such, the second liquid source is employed to independently supply liquid for the second process. During the third process, the first pumped storage power generation unit, the first port group of the hydraulic potential energy conversion unit and the low pressure water tank form a liquid circulation channel (only if the compressed gas storage unit 110 is not directly connected to the first port group of the hydraulic potential energy conversion unit, or additional equipment is employed to achieve migration in an equal pressure manner, the devices can form a closed liquid circulation channel. On the other hand, there is a liquid exchange between the liquid circulation channel and the compressed gas storage unit 110). In consideration with the liquid residues' impact on the hydro-generator of the first pumped power generation unit (e.g., liquid impurity loss), the liquid circulation channel may be supplied with a pure liquid without residues. The liquid sources used in the three processes described may be combined. At the same time, the piston of the migration apparatus which moves the gas in an equal density manner can act as a device for converting the gas in the different states. At the same time, the piston of the migration apparatus keeps the compressed gas storage unit 110 from being directly connected to the gas channel of the liquid piston device 130 so as to avoid the situation that the compressed gas storage unit 110 and the gas of the liquid piston device 130 affect each other. As a result, the compressed gas storage unit 110 can maintain a constant gas pressure.

Figure 19:
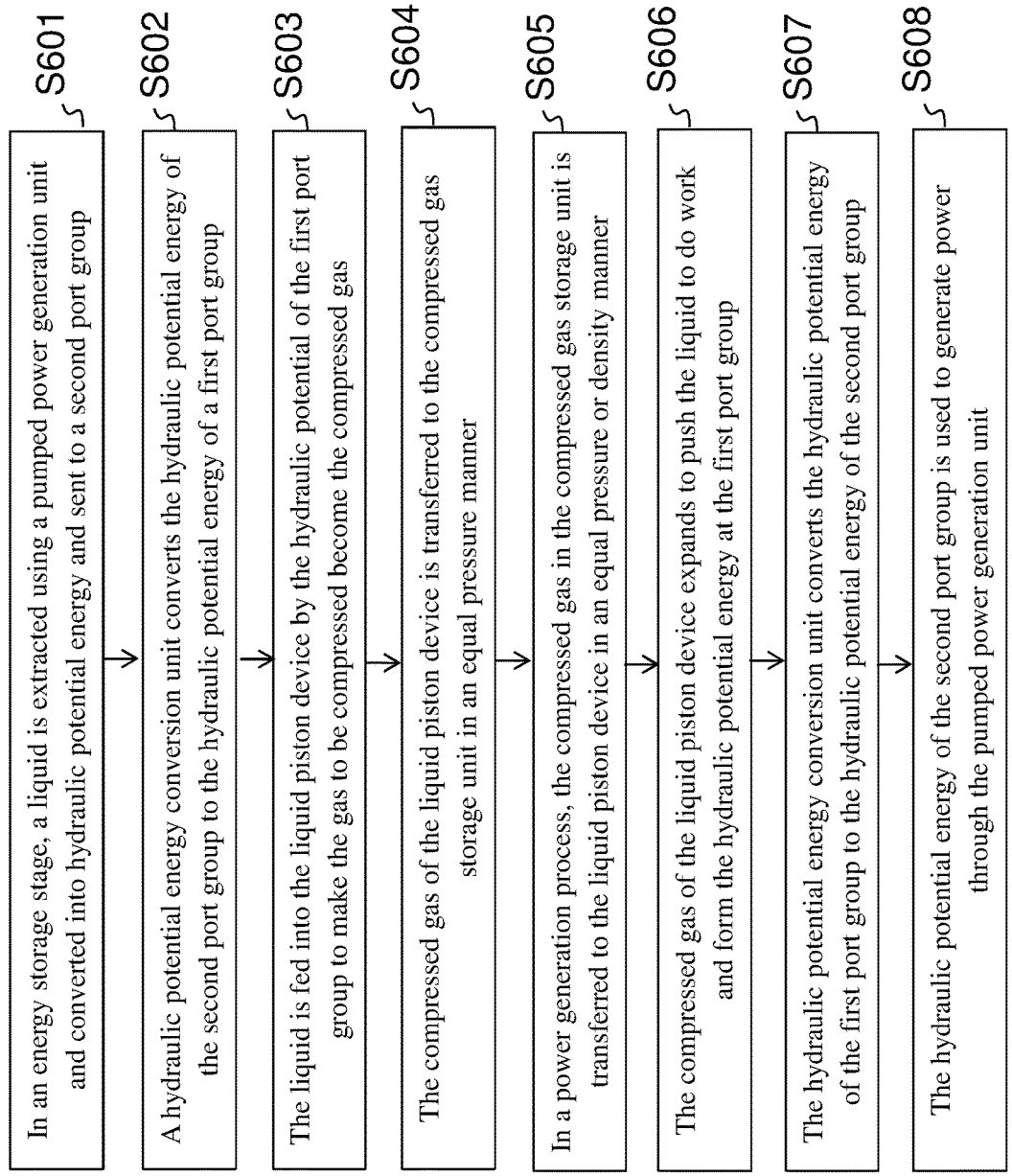
FIG. 19 illustrates a flowchart in accordance with various embodiments of the present disclosure.

FIG. 19 illustrates a flowchart in accordance with various embodiments of the present disclosure. This flowchart shown in FIG. 19 is merely an example, which should not unduly limit the scope of the claims. One of ordinary skill in the art would recognize many variations, alternatives, and modifications. For example, various steps illustrated in FIG. 19 may be added, removed, replaced, rearranged and repeated. The embodiment shown in FIG. 19 is alternatively referred to as a seventh implementation of the combined gas-liquid two-phase energy storage system.

The combined gas-liquid two-phase energy storage system comprises a compressed gas storage unit, a first gas pipe, a liquid piston device, a hydraulic potential energy conversion unit and a first pumped power generation unit. The compressed gas storage unit comprises a liquid storage space and a gas storage space interconnected to each other, and a first high-pressure liquid pipe connected with the liquid storage space. The liquid piston device is connected with the gas storage space and the first gas pipeline, respectively. The hydraulic potential energy conversion unit comprises a first port group and a second port group. The liquid piston device is connected with the first port group. The first pumped power generating unit is connected with the second port group. As shown in FIG. 19, the energy storage and power generation method includes steps from S601 to S608.

At step S601: in an energy storage process, a liquid (e.g., water) is extracted using a pumped power generation unit and converted into hydraulic potential energy and sent to a second port group. For example, the energy storage process can be performed when a power system (a power grid) operates in a light load condition.

Step S602: a hydraulic potential energy conversion unit is used to convert the hydraulic potential energy of the second port group to the hydraulic potential energy of a first port group.

Step S603: the liquid is fed into the liquid piston device by the hydraulic potential of the first port group to make the gas to be compressed become the compressed gas.

Step S604: the compressed gas of the liquid piston device is transferred to the compressed gas storage unit in an equal pressure manner. For example, a portion of the liquid in the liquid storage space is discharged through the first high-pressure liquid pipe to achieve a constant pressure migration of the compressed gas from the liquid piston device to the compressed gas storage unit.

Step S605: in a power generation process, the compressed gas stored in the compressed gas storage unit is transferred to the liquid piston device in an equal pressure or equal density manner. For example, the liquid is fed to the liquid storage space through the first high-pressure liquid pipe to achieve a constant pressure migration of the compressed gas from the compressed gas storage unit to the liquid piston device.

Step S606: the compressed gas of the liquid piston device expands to push the liquid to do work and form the hydraulic potential energy at the first port group.

Step S607: the hydraulic potential energy conversion unit is used to convert the hydraulic potential energy of the first port group to the hydraulic potential energy of the second port group.

Step S608: the hydraulic potential energy of the second port group is used to generate power through the pumped power generation unit.

In the energy storage and power generation method provided by the present embodiment, the energy storage method does not need to be provided with a gas turbine. As a result, the system does not consume gas, thereby avoiding the environmental pollution. In addition, since the process of transferring the compressed gas from the compressed gas storage unit to the liquid piston device, and the process of transferring the compressed gas from the temperature-controlled liquid piston to the compressed gas storage unit are an isobaric migration process (an equal pressure process), the pressure of the compressed gas storage unit is constant so as to avoid damages to the compressed gas storage unit during the gas compression process and/or the expansion process, thereby extending the life of the compressed gas storage unit. On the other hand, since the compressed gas storage unit is not designed for the pressure changes and/or the temperature changes, the construction cost or the manufacturing cost of the compressed gas storage unit can be reduced accordingly. In addition, the constant pressure storage characteristics of the compressed gas storage unit are used to provide a stable water head for the first pumped power generation unit and reduce the turbine generator blade losses caused by the water head changes, thereby improving the power generation efficiency of the combined gas-liquid two-phase energy storage system.

For example, the energy storage and power generation method provided in the present embodiment further includes the following advantages. During the process of generating power, the pressure of the compressed gas storage unit is used for stabilizing the liquid pressure of the second port group. Since the first pumped power generation unit is connected to the second port group, the steady pressure of the compressed gas storage unit can be used to form a stable water head for the first pumped power generating unit, thereby improving the efficiency of the first pumped power generation unit. For example, the first pumped power generation unit may include a turbine. The usual turbine requires a stable water head to achieve the highest power generation efficiency. A constantly changing (unstable) water head may cause greater damages to the blades of the turbine, which may result in poor power generation efficiency. As such, the energy storage and power generation method utilizes the steady pressure of the compressed gas storage unit to stabilize the inlet water head of the first pumped power generation unit so that the first power generation unit can achieve higher power generation efficiency.

For example, the energy storage and power generation method of the present embodiment further includes connecting one end of the first high-pressure liquid pipe to the liquid storage space, and connecting the other end of the first high-pressure liquid pipe to the second port group so that the liquid pressure of the second port group can be stabilized by the pressure of the compressed gas storage unit.

For example, in the energy storage and power generation method provided of the present embodiment, the combined gas-liquid two-phase energy storage and power generation system further includes a first buffer tank, a first liquid space and a first gas space having a first height difference from the first pumped power generation unit, a second high-pressure liquid pipe and a second gas pipe. The energy storage and power generation method further comprises connecting one end of the second gas pipe to the first gas space, connecting the other end the second gas pipe with the gas storage space, connecting one end of the second high-pressure liquid pipe with the first liquid space, and connecting the other end of the second high-pressure liquid pipe with the second port group so as to stabilize the liquid pressure of the second port group by using the pressure of the compressed gas storage unit through the first buffer tank. In addition, the pressure of the second port group can be adjusted by setting the height of the first buffer tank relative to the compressed gas storage unit (e.g., the first height difference) so that a new liquid pressure can be provided when the first pumped power generation unit generates power. It should be noted that since the compressed gas storage unit can be designed in accordance with actual environment conditions and capacity installation requirements, the pressure may not match the water head required by the first pumped power generation unit. By providing the above-described first buffer tank, the second high-pressure, and the second gas pipe, the liquid pressure of the second port group may be adjusted to match the water head required by the first pumped power generation unit during the power generation process.

For example, the energy storage and power generation method the present embodiment further includes using the first pumped power generation unit to control the liquid flow rate of the inflow/outflow per unit time of the first high-pressure liquid pipe or the flow of the first buffer tank so that the internal pressure of the compressed gas storage unit remains stable. For example, when the gas is compressed, by using the pumped power generation unit, the liquid inflow amount of the first high-pressure liquid pipe is equal to the liquid outflow amount of the or the first high-pressure liquid pipe, or the liquid inflow amount of the first buffer tank is equal to the liquid outflow amount of the or the first buffer tank so that the pressure inside the compressed gas storage unit is kept stable. When the compressed gas is transferred to the storage unit in an equal pressure manner, by using the pumped power generation unit, the liquid outflow amount of the first high-pressure liquid pipe or the liquid outflow amount of the first buffer tank is equal to the sum of the amount of the inflow liquid and the amount of the moved-in compressed gas so that the internal pressure of the compressed gas storage unit is kept stable. When the compressed gas moves out of the compressed gas storage unit, by using the pumped power generation unit, the liquid inflow amount of the first high-pressure liquid pipe or the liquid inflow amount of the first buffer tank can be equal to the sum of the amount of the outflow liquid and the amount of the moved-out compressed gas so that the internal pressure of the compressed gas the storage unit is kept stable. It should be noted that the amount of the above-mentioned liquid and the amount of the compressed gas may be the volume occupied by the liquid and the compressed gas.

For example, in the energy storage and power generation method of the present embodiment, the hydraulic potential energy conversion unit includes a switching adjustment unit. The energy storage and power generation method includes using the switching adjustment unit to control the inflow/outflow (per unit time) of the first high-pressure liquid pipe or the liquid flow of the first buffer tank so that the pressure inside the compressed gas storage unit remains stable. It should be noted that the above-mentioned method of using the first pumped power generation unit to control the liquid flowing into and out of the first high-pressure liquid pipe or the liquid flow of the first buffer tank per unit time and the above-mentioned method of using the switching adjustment unit to control the liquid inflow/outflow (per unit time) of the high-pressure liquid pipe or the liquid flow of the first buffer tank may be used individually or in combination, and the embodiments of the present disclosure are not limited thereto.

For example, in the energy storage and power generation method of the present disclosure, the second liquid source may be an open liquid source (e.g., the liquid source stored therein is more than that required by the system and the liquid temperature is kept at ambient temperature). The second liquid source and the piston device may also be formed by a material having been treated with a thermal insulation process. The liquid in the second liquid source is used for having a heat exchange with the gas of the liquid piston device in a compression process or an expansion process, and insulating the heat or cold energy during the compression process or the expansion process.

For example, the energy storage and power generation method of the present embodiment further includes the following steps. During the energy storage process, a liquid having a first temperature is provided to the liquid piston device when the gas in the liquid piston device is compressed by the hydraulic potential of the first port group. During the power generation process, a liquid having a second temperature is provided to the liquid piston device before the compressed gas of the liquid piston device is transferred to the compressed gas storage unit in an equal pressure manner. The second temperature is greater than the first temperature. Thus, the liquid having the first temperature can absorb the heat generated when the gas is compressed, and the gas temperature and the gas pressure are reduced so as to reduce the energy used in the gas compression process. The liquid having the second temperature can provide heat when the gas does work by expansion. The gas temperature and the gas pressure are increased to achieve a higher energy output, thereby improving the power generation efficiency of the energy storage method.

For example, the energy storage and power generation method of the present embodiment further includes providing a liquid having a third temperature for the liquid piston device when the gas in the liquid piston device is compressed by the hydraulic potential of the first port during the energy storage process. The liquid in the second liquid source is circulated and repeatedly fed into the liquid piston device for participating in the gas compression process to absorb the heat generated by the gas compression process, and finally the liquid in the second liquid source is converted into a liquid having a fourth temperature, which is adiabatically stored by the second liquid source. In the power generation process, the liquid stored in the second liquid source is supplied to the liquid piston device before the compressed gas of the liquid piston device moves to the compressed gas storage unit in an equal pressure manner. When the compressed gas expands and increases the hydraulic potential of the piston device supplied to the first port group, the compressed gas expands to absorb the liquid heat and the liquid temperature is reduced accordingly. The liquid is discharged from the liquid piston device and is stored. Thus, the heat can be generated when the gas is compressed and the heat is used again when the gas does work by expansion. The waste of energy can be reduced so that the power generation efficiency of the energy storage method can be improved. On the other hand, the energy storage method reuses the liquid in the second liquid source, thereby reducing the use of the water resource.

For example, the energy storage and power generation method of the present embodiment further includes providing a liquid having a fifth temperature to the liquid piston device when the gas in the liquid piston device is compressed by the hydraulic potential of the first port during the energy storage process. The liquid having the fifth temperature is converted into a liquid having a sixth temperature during the energy storage process. The liquid having the sixth temperature can be used to generate residential heat or generate power. During the power generation process, a liquid having a seventh temperature is supplied to the liquid piston device before the compressed gas of the liquid piston device is transferred from the liquid piston device to the compressed gas storage unit in an equal pressure manner. The liquid having the seventh temperature is converted into a liquid having an eighth temperature when the compressed gas expands and increases the hydraulic potential of the piston device supplied to the first port group. The liquid having the eighth temperature is used for cooling. As such, the temperature of the compressed gas is controlled by the liquid having the fifth temperature so as to reduce the external energy consumed by the compressed gas, and the liquid having the fifth temperature can be heated to become the liquid having the sixth temperature by utilizing the heat generated during the gas compression process. The liquid having the sixth temperature can be used for heating or power generation, thereby improving the power generation efficiency of the energy storage and power generation method. On the other hand, the liquid having the seventh temperature is used to provide additional heat for the compressed gas, thereby improving the ability of doing work by expansion. At the same time, the liquid having the seventh temperature can be cooled to the liquid having the eighth temperature by the principle of endotherm during the process of doing work by gas expansion so that the liquid having the eighth temperature can be used for cooling.

For example, in the energy storage and power generation method of the present embodiment, the fifth temperature is greater than the seventh temperature. As such, the liquid having the fifth temperature can be heated to the liquid having the sixth temperature by utilizing the heat generated during the gas compression process to further improve the quality of the energy so that the originally low quality energy of the liquid having the fifth temperature is converted into high quality energy of a liquid having the sixth temperature. On the other hand, based upon the principle of endothermic heat during the process of doing work by gas expansion, the low quality energy of the liquid having the seventh temperature can be converted to the high quality energy of the liquid having the eighth temperature.

For example, in the energy storage and power generation method of the present embodiment, during the energy storage process, when the gas temperature is lower than the liquid temperature, the gas can be controlled such that the gas is adiabatically compressed by the compressor and then has an isothermal compression process, thereby reducing the energy consumption in the gas compression process. During the power generation process, if the gas temperature is higher than the liquid temperature, the gas can be controlled such that the gas adiabatically expands in an expanding apparatus and then has an isothermal expansion process, thereby improving the power generation efficiency.

The following points need to be explained. First, in the drawings of the embodiments of the present disclosure, only the structures related to the embodiments of the present disclosure are referred to, and other structures may be referred to the conventional design. Second, in the case of no conflict, the features of the same embodiment and different embodiments of the present disclosure may be combined with each other.

The foregoing is merely illustrative of the present disclosure and is not intended to limit the scope of the present disclosure, and the scope of the present disclosure is defined by the appended claims.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:
a compressed gas storage unit comprising a liquid storage space, a gas storage space connected to the liquid storage space and a first high-pressure liquid pipe connected to the liquid storage space, wherein the gas storage space is configured to store compressed gas with a stable pressure, and the liquid storage space is configured to store liquid, and the first high-pressure liquid pipe is configured to maintain a pressure of the compressed gas by inputting or outputting liquid to/from the liquid storage space;
a first gas pipe configured to transport gas to be compressed in an energy storage process and deliver expanded gas in a power generation process;
a liquid piston device connected to the gas storage space and the first gas pipe respectively;
a hydraulic potential energy conversion unit comprising a first port group and a second port group and configured to convert hydraulic potential energy between the first port group and the second port group, wherein a first end of the first high-pressure liquid pipe is connected to the liquid storage space and a second end of the first high-pressure liquid pipe is connected to the second port group; and
a first pumped power generation unit configured to convert electric energy into the hydraulic potential energy through extracting the liquid, and generate electricity by utilizing the hydraulic potential energy, wherein the liquid piston device is connected to the first port group and configured to receive/output the hydraulic potential energy from/to the first port group, the first pumped power generation unit is connected to the second port group and configured to receive/output the hydraulic potential energy from/to the second port group.

2. The system of claim 1, further comprising:
a first buffer tank including a first liquid space and a first gas space, wherein the first buffer tank and the first pumped power generation unit have a first height difference;
a second high-pressure liquid pipe configured to store or transport high-pressure liquid; and
a second gas pipe configured to store or transport the compressed gas, wherein:
a first end of the second gas pipe is connected to the first gas space;
a second end of the second gas pipe is connected to the gas storage space;
a first end of the second high-pressure liquid pipe is connected to the first liquid space; and
a second end of the second high-pressure liquid pipe is connected to the second port group.

3. The system of claim 1, wherein the hydraulic potential energy conversion unit further comprises:
a switching adjustment unit configured to adjust a hydraulic potential energy conversion rate of the hydraulic potential energy conversion unit, perform safety control and balance a hydraulic potential energy difference between the first port group and the second port group.

4. The system of claim 1, further comprising:
a first liquid source connected to the first port group and the second port group of the hydraulic potential energy conversion unit, respectively.

5. The system of claim 1, further comprising:
a second liquid source connected to the liquid piston device and the first port group of the hydraulic potential energy conversion unit, respectively, the second liquid source being configured to receive/supply liquid from/to the liquid piston device, wherein the second liquid source is configured to provide a liquid having a different temperature so as to control a temperature of the compressed gas in the liquid piston device during gas compression and expansion processes.

6. The system of claim 1, further comprising:
a second pumped power generation unit connected to the liquid piston device and the liquid storage space of the compressed gas storage unit, respectively.

7. The system of claim 6, further comprising:
a second buffer tank including a second liquid space and a second gas space, wherein:
the second liquid space is connected to the liquid storage space through the second pumped power generation unit, and connected to the liquid piston device; and
the second gas space is connected to the liquid piston device and the gas storage space, respectively.

8. The system of claim 1, further comprising:
a mixed gas-liquid potential energy conversion unit having a third liquid port group, a fourth liquid port group, a gas port group and a control unit; and
a third liquid source configured to deliver liquid to the compressed gas storage unit or receive liquid from the compressed gas storage unit, wherein:
the third liquid port group is connected to the liquid storage space and the third liquid source, respectively;
the fourth liquid port group is connected to the liquid piston device and a second liquid source, respectively;
the gas port group is connected to the gas storage space and the liquid piston device, respectively; and
the control unit is configured to control a potential energy conversion rate of the mixed gas-liquid potential energy conversion unit to balance potential energy of the third liquid port group, the fourth liquid port group and the gas port group so as to transport a plurality of compressed gases having different pressures and temperatures between the compressed gas storage unit and the liquid piston device in an equal density manner.

9. The system of claim 1, further comprising:
the first pumped power generation unit is selected from the group consisting of a reversible hydro-turbine unit, a combination of a hydro-generator unit and a hydro pump, a combination of a hydro-turbine and a hydraulic motor, a combination of a hydraulic piston apparatus and a linear generator, and a crank generator.

10. The system of claim 1, wherein the first pumped power generation unit comprises:
a hydro-turbine generator unit, a pressure conversion unit and a stable water head pool, and wherein:
the pressure conversion unit is placed at one side of a water inlet of the hydro-turbine generator unit; and the stable water head pool is placed between the hydro-turbine generator unit and the pressure conversion unit, and wherein the pressure conversion unit is configured to adjust a hydraulic pressure in the water inlet of the hydro-turbine generator unit.

11. The system of claim 1, wherein the liquid piston device comprises:
a pressure vessel;
a liquid circulating pipeline connected with a top and a bottom of the pressure vessel; and
a circulating motor placed on the liquid circulating pipeline, and wherein the circulating motor is configured to deliver the liquid at the bottom of the pressure vessel or an external liquid to the top of the pressure vessel through the liquid circulating pipe.

12. The system of claim 1, wherein the compressed gas storage unit comprises:
an inner vessel comprising a first tank with a third liquid pipe; and
an outer vessel comprising a second tank with a third gas pipe, and wherein:
the inner vessel is placed inside the outer vessel;
the inner vessel has an opening at a bottom of the inner vessel; and
the third liquid pipe is configured to input/output liquid, and the third gas pipe is configured to input/output gas.

13. The system of claim 1, wherein the compressed gas storage unit comprises:
an inner vessel comprising a first tank with a fourth gas pipe; and
an outer vessel comprising a second tank with a fourth liquid pipe extending into the second tank, and wherein the inner vessel with an opening at a top of the inner vessel, and the inner vessel is inside the outer vessel, and the fourth liquid pipe is configured to input/output liquid, and the fourth gas pipe is configured to input/output gas.

14. A method comprising:
in an energy storage process, converting electric energy into hydraulic potential energy by extracting liquid through a first pumped power generation unit and outputting the hydraulic potential energy to a second port group of a hydraulic potential energy conversion unit connected to the first pumped power generation unit;
converting the hydraulic potential energy of the second port group to hydraulic potential energy of a first port group of the hydraulic potential energy conversion unit;
by using the hydraulic potential energy of the first port group, pushing the liquid into a liquid piston device and converting gas to be compressed into compressed gas;
transporting the compressed gas from the liquid piston device to a compressed gas storage unit in a first equal pressure or equal density manner;
in a power generation process, transporting a portion of the compressed gas from the compressed gas storage unit to the liquid piston device in a second equal pressure or equal density manner;
forming hydraulic potential energy at the first port group through doing work by expansion of the compressed gas in the liquid piston device;
converting the hydraulic potential energy of the first port group to hydraulic potential energy of the second port group; and
generating electricity using the hydraulic potential energy of the second port group through the first pumped power generation unit, wherein:
the compressed gas storage unit comprises a liquid storage space, a gas storage space connected to the liquid storage space, a first high-pressure liquid pipe connected to the liquid storage space, and wherein the first high-pressure liquid pipe is configured to maintain a pressure of the compressed gas by inputting or outputting liquid to/from the liquid storage space;
a first gas pipe is configured to transport the gas to be compressed in the energy storage process and deliver expanded gas in the power generation process; and
the liquid piston device is connected to the gas storage space and the first gas pipe, respectively, and wherein:
a liquid pressure of the second port group is stabilized by a stable pressure of the compressed gas storage unit during the power generation process; and
a first end of the first high-pressure liquid pipe is connected to the liquid storage space of the compressed gas storage unit and a second end of the first high-pressure liquid pipe is connected to the second port group, and wherein the energy storage process and the power generation process further employ a first buffer tank, and wherein the first buffer tank includes a first liquid space, a first gas space, a second high-pressure liquid pipe and a second gas pipe, and wherein:
a first end of the second gas pipe is connected to the first gas space and a second end of the second gas pipe is connected to the gas storage space; and
a first end of the second high-pressure liquid pipe is connected to the first liquid space and the a second end of the second high-pressure liquid pipe is connected to the second port group.

15. The method of claim 14, further comprising:
the first pumped power generation unit controlling a flow rate of the liquid flowing into/out of the first high-pressure liquid pipe or the first buffer tank to stabilize a pressure inside the compressed gas storage unit.

16. The method of claim 14, wherein:
the hydraulic potential energy conversion unit further comprises a switching adjustment unit, and wherein the switching adjustment unit controls a flow rate of the liquid flowing into/out of the first high-pressure liquid pipe or the first buffer tank to stabilize a pressure inside the compressed gas storage unit.

* * * * *